United States Patent
Date et al.

(10) Patent No.: US 9,950,630 B2
(45) Date of Patent: Apr. 24, 2018

(54) VEHICLE POWER SOURCE SYSTEM

(71) Applicant: Mitsubishi Electric Corporation, Tokyo (JP)

(72) Inventors: Toshiaki Date, Tokyo (JP); Yasukazu Murata, Hyogo (JP); Satoshi Wachi, Tokyo (JP); Shingo Yamaguchi, Tokyo (JP); Nozomu Kamioka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 399 days.

(21) Appl. No.: 14/758,283

(22) PCT Filed: May 22, 2013

(86) PCT No.: PCT/JP2013/064258
§ 371 (c)(1),
(2) Date: Jun. 29, 2015

(87) PCT Pub. No.: WO2014/188541
PCT Pub. Date: Nov. 27, 2014

(65) Prior Publication Data
US 2015/0352968 A1 Dec. 10, 2015

(51) Int. Cl.
*B60L 1/00* (2006.01)
*B60L 3/00* (2006.01)
(Continued)

(52) U.S. Cl.
CPC ......... *B60L 11/1809* (2013.01); *B60L 3/0046* (2013.01); *B60L 7/14* (2013.01);
(Continued)

(58) Field of Classification Search
CPC .. B60L 11/1809; B60L 11/08; B60L 11/1868; B60L 7/14; B60L 11/1811; B60L 3/0046; Y02T 10/7066; Y02T 10/7005
See application file for complete search history.

(56) References Cited

U.S. PATENT DOCUMENTS 6,198,259 B1 * 3/2001 Ueki .................. H02J 7/0054
323/224
6,351,104 B1 * 2/2002 Koelle .................. H02J 7/1438
322/22
(Continued)

FOREIGN PATENT DOCUMENTS

JP 3972906 B2 9/2007
JP 2008-072880 A 3/2008
(Continued)

OTHER PUBLICATIONS

International Search Report for PCT/JP2013/064258 dated Jul. 30, 2013.

*Primary Examiner* — Rexford Barnie
*Assistant Examiner* — Rasem Mourad
(74) *Attorney, Agent, or Firm* — Sughrue Mion, PLLC; Richard C. Turner

(57) ABSTRACT

While a current cutoff mechanism cuts off charging and discharging currents for a second electric storage device, a DC/DC converter is controlled so as to be in a state where electric power is supplied from a low-voltage side to a high-voltage side, applies voltage conversion to an input voltage of the low-voltage side so that an output voltage of the high-voltage side becomes a predetermined voltage, and after a predetermined state where the induction voltage of the AC power generator can be supplied to the low-voltage side is reached, control of the DC/DC converter is switched from the state where electric power is supplied from the low-voltage side to the high-voltage side to a state where electric power is supplied from the high-voltage side to the low-voltage side.

15 Claims, 17 Drawing Sheets

(51) Int. Cl.
*H02G 3/00* (2006.01)
*B60L 11/18* (2006.01)
*B60L 11/08* (2006.01)
*H02M 3/158* (2006.01)
*B60L 7/14* (2006.01)
*B60L 11/00* (2006.01)
*B60L 11/14* (2006.01)

(52) U.S. Cl.
CPC ............. *B60L 11/005* (2013.01); *B60L 11/08* (2013.01); *B60L 11/14* (2013.01); *B60L 11/1868* (2013.01); *H02M 3/158* (2013.01); *H02M 3/1588* (2013.01); *B60L 2210/10* (2013.01); *B60L 2210/40* (2013.01); *B60L 2240/441* (2013.01); *Y02T 10/70* (2013.01); *Y02T 10/7005* (2013.01); *Y02T 10/7022* (2013.01); *Y02T 10/7066* (2013.01); *Y02T 10/7077* (2013.01); *Y02T 10/7216* (2013.01); *Y02T 10/7241* (2013.01)

(56) References Cited

U.S. PATENT DOCUMENTS

| | | | | |
|---|---|---|---|---|
| 2003/0029654 A1* | 2/2003 | Shimane | ................ | B60K 6/28 180/65.29 |
| 2006/0097577 A1* | 5/2006 | Kato | ................ | F02N 11/0866 307/10.1 |
| 2008/0101096 A1* | 5/2008 | Takayanagi | ............. | H02J 7/022 363/17 |
| 2011/0248687 A1* | 10/2011 | Kamioka | ................ | H02J 7/16 322/60 |
| 2013/0038271 A1* | 2/2013 | Park | ........................ | B60K 6/28 320/104 |
| 2013/0058134 A1* | 3/2013 | Yamada | ................ | H02M 7/217 363/17 |
| 2013/0140816 A1 | 6/2013 | Kamioka et al. | | |
| 2013/0334879 A1* | 12/2013 | Ido | ....................... | B60R 16/033 307/10.1 |
| 2014/0346858 A1* | 11/2014 | Schalli | ............... | B60L 11/1868 307/9.1 |

FOREIGN PATENT DOCUMENTS

| | | |
|---|---|---|
| JP | 2010-130877 A | 6/2010 |
| JP | 2011-223748 A | 11/2011 |
| JP | 2012-075280 A | 4/2012 |
| WO | 2011/151940 A1 | 12/2011 |
| WO | WO 2011151940 A1 * 12/2011 | ............ H02M 7/217 |

\* cited by examiner

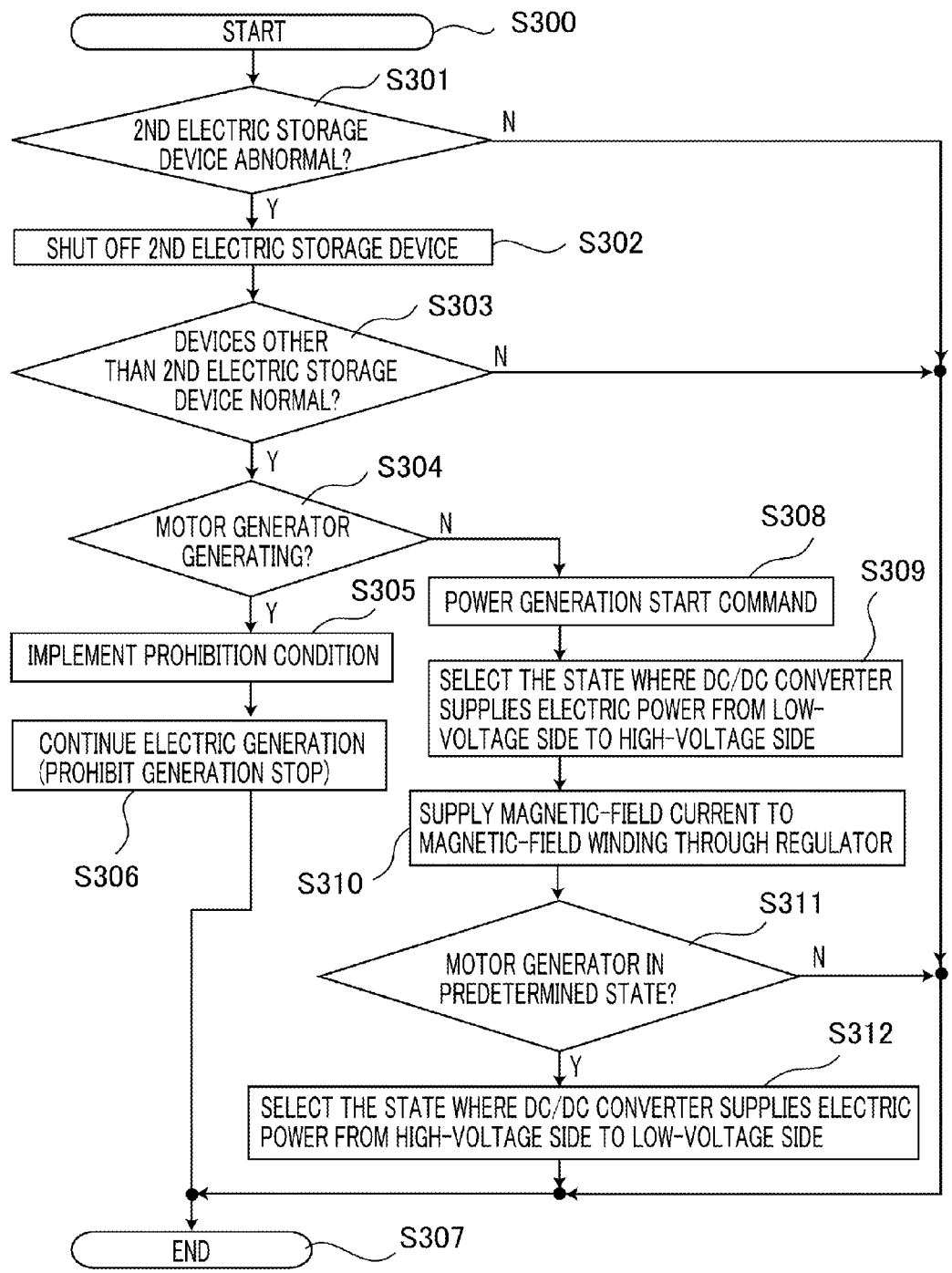

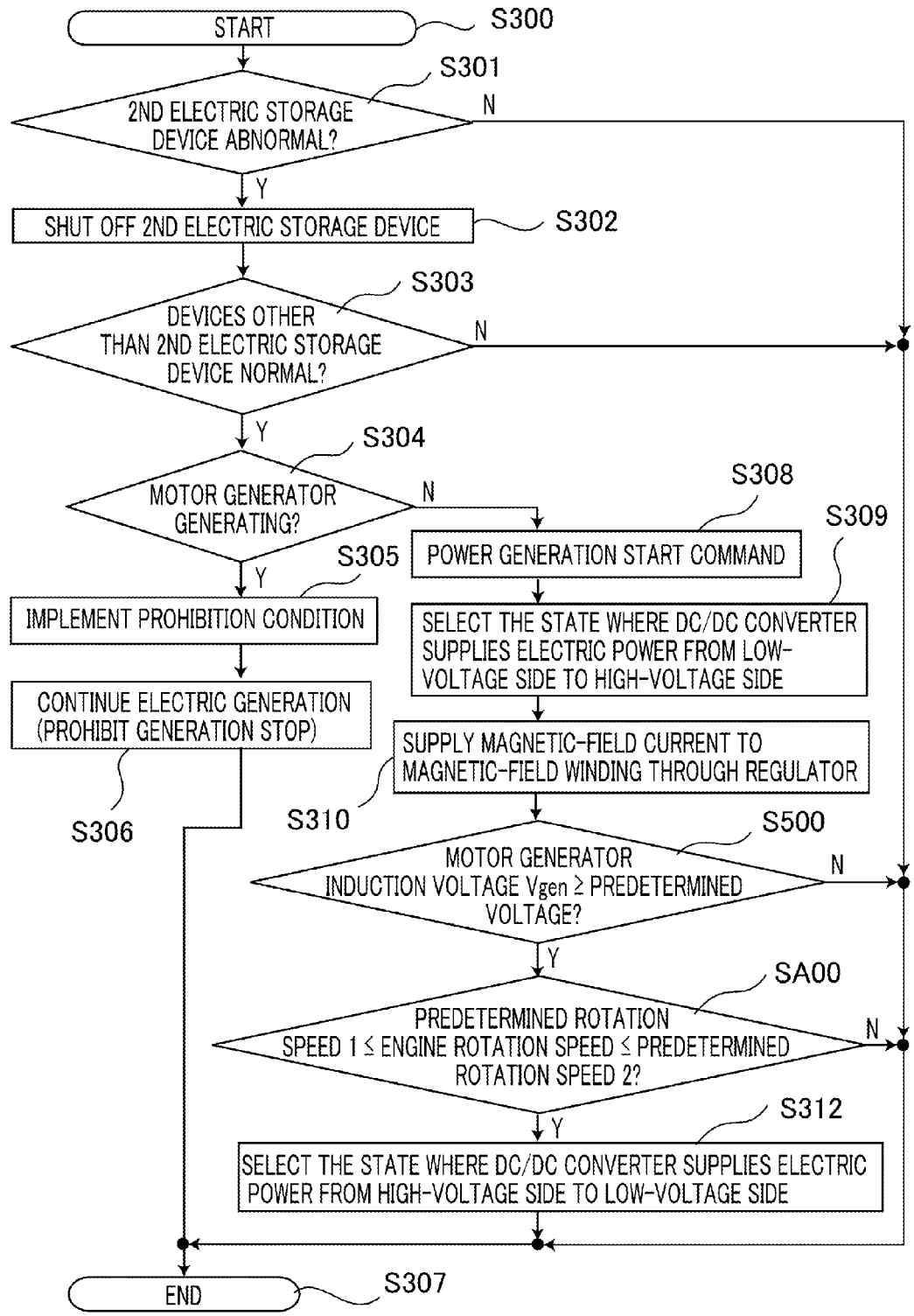

VEHICLE POWER SOURCE SYSTEM

CROSS REFERENCE TO RELATED APPLICATIONS

This application is a National Stage of International Application No. PCT/JP2013/064258 filed May 22, 2013, the contents of which are incorporated herein by reference in their entirety.

TECHNICAL FIELD

The present invention relates to a vehicle power source system provided with two electric storage devices having different voltages.

BACKGROUND ART

As is well known, there exists a vehicle power source system provided with two electric storage devices having different voltages. There will be considered the case where in such a vehicle power source system, a high-voltage electric storage device out of the two electric storage devices fails. In the case where the high-voltage electric storage device fails, it is required to cut off charging and discharging currents for the high-voltage electric storage device so as to prevent the charging and discharging currents from providing an adverse effect to other devices and circuits. That is to say, for example, in the case where the high-voltage electric storage device is formed of a lithium ion battery and the lithium ion battery fails, excessive charging or abnormal heat generation may cause smoke or fire; therefore, the charging and discharging currents need to be cut off as soon as possible. Thus, when the high-voltage electric storage device fails, a current cutoff mechanism (e.g., a relay) cuts off the charging and discharging currents for the high-voltage electric storage device.

However, even when the high-voltage electric storage device fails and hence the charging and discharging currents therefor is cut off, it is required to make the vehicle travel to and stop in a safe place, i.e., a limb-home function is required; for the purpose of obtaining the limb-home function, it is required to continue or restart the power generation. In this situation, for example, in the case of a vehicle power source system in which the electric power generator is an AC power generator that has a magnetic-field winding and is driven by rotation power of an internal combustion engine or the like so as to generate AC electric power and a high-voltage electric storage device supplies electric power to the magnetic-field winding by way of a magnetic-field circuit, it is not made possible to supply electric power to the magnetic-field circuit so as to continue or restart the electric-power generation, when the high-voltage electric storage device is shut down. To date, in order to solve the foregoing problems, technologies disclosed, for example, in Patent Documents 1 through 4 have been proposed.

That is to say, Patent Document 1 discloses a technology in which there are provided two electric storage devices as a main power source and a subsidiary power source having different voltages, a first power supply circuit that connects the subsidiary power source with the main power source and general loads by way of a DC/DC converter, a second power supply circuit that is in parallel with the first power supply circuit and connects the subsidiary power source with the main power source and general loads by way of a switch, and a control means that controls the operations of the DC/DC converter and the switch and in which there is selected any one of a first control state where the DC/DC converter is activated and the switch is opened and a second control state where the DC/DC converter is stopped and the switch is closed. This technology makes it possible that when the subsidiary power source fails and is shut down, the first power supply circuit is disconnected and the second power supply circuit is connected so that electric power is supplied from the main power source to the magnetic-field circuit.

Patent Document 2 discloses a technology in which there are provided two electric storage devices having different voltages, an electric power generator including a rotor having a magnetic-field coil and a stator having an armature coil, a rectifier that rectifies AC electric power generated across the armature coil, an excitation control circuit that controls a voltage to be supplied to the magnetic-field coil, a capacitor that is connected to the DC side of the rectifier and receives and supplies electric power, a battery connected with a load, a DC/DC converter that is connected between the capacitor and the battery and can convert a unilaterally or bilaterally inputted DC voltage into an arbitrary voltage, and a selection switch that can select the capacitor or the battery as a power supplying source for the excitation control circuit. This technology makes it possible that when the capacitor fails and is cut off, the selection switch is switched over to the battery side so that electric power is supplied from the battery to the excitation control circuit.

Moreover, Patent Document 3 discloses a technology in which there are provided two electric storage devices having different voltages, an AC/DC converter unit that converts an AC voltage into a DC voltage, a smoothing capacitor connected with the DC side of the AC/DC converter unit, a DC/DC converter unit that has a semiconductor switch and applies DC/DC conversion to DC electric power across the smoothing capacitor so as to supply the DC electric power to a load, and a control device that, while controlling the AC power factor, controls the AC/DC converter unit so that the DC voltage of the AC/DC converter unit follows a target value and concurrently controls the DC/DC converter unit through duty control of the semiconductor switch so that a DC input or output between the DC/DC converter unit and the load follows a command value and in which when the duty ratio of the semiconductor switch is 100☐, the semiconductor is always on, so that when the voltage drops in the semiconductor and the smoothing reactor are neglected, the output voltage of the DC/DC converter unit becomes equal to the output voltage (the voltage across the smoothing capacitor). This technology enables the input and output sides of the DC/DC converter to communicate with each other; thus, it is made possible that when the high-voltage electric storage device is shut down, the input and output sides of the DC/DC converter are made to communicate with each other so that electric power is supplied from the low-voltage electric storage device to the magnetic-field circuit.

Patent Document 4 discloses a technology for a vehicle power source apparatus in which there are provided a first electric storage device, a second electric storage device that is charged and discharged at a voltage lower than the voltage of the first electric storage device, an inverter circuit that receives a voltage from the first electric storage device by way of an opening/closing switch, a smoothing capacitor provided in parallel with and between the first electric storage device and the inverter circuit, a DC/DC converter that is provided between the smoothing capacitor and the second electric storage device, applies voltage conversion to electric energy stored in the first electric storage device or the smoothing capacitor so as to supply the converted electric energy to the second electric storage device, and applies voltage conversion to electric energy stored in the second electric storage device so as to supply the converted electric energy to the smoothing capacitor, and an electronic control unit that controls the DC/DC converter, before the inverter circuit is energized, so as to charge the smoothing capacitor up to a voltage that is within a predetermine allowable voltage range of the storage voltage of the first electric storage device and then close the opening/closing switch, in which the DC/DC converter is provided with a step-down switching circuit connected with the smoothing capacitor, a step-up switching circuit connected with the second electric storage device, and a transformer provide between the step-down switching circuit and the step-up switching circuit, steps up a voltage from the second electric storage device so as to supply the stepped-up voltage to the smoothing capacitor, when the control by the electronic control unit switching-drives the step-up switching circuit, and steps down a voltage supplied from the first electric storage device by way of the opening/closing switch so as to supply the stepped-down voltage to the second electric storage device, when the control by the electronic control unit switching-drives the step-down switching circuit, and in which when the voltage applied to the smoothing capacitor becomes higher than the output voltage of the first electric storage device, the electronic control unit stops the switching driving of the step-up switching circuit and then activates the step-down switching circuit.

PRIOR ART REFERENCE

Patent Document

[Patent Document 1] Japanese Patent No. 3972906
[Patent Document 2] Japanese Patent Application Laid-Open No. 2011-223748
[Patent Document 3] International Publication No. WO2011/151940
[Patent Document 4] Japanese Patent No. 3625789

DISCLOSURE OF THE INVENTION

Problems to be Solved by the Invention

Each of the foregoing technologies makes it possible that when the high-voltage electric storage device fails and is shut down, the low-voltage electric storage device can supply electric power to the magnetic-field circuit; however, there exist problems stated below.

That is to say, the technology disclosed in Patent Document 1 requires the first power supply circuit that connects the subsidiary power source with the main power source and general loads by way of a DC/DC converter and the second power supply circuit that is in parallel with the first power supply circuit and connects the subsidiary power source with the main power source and general loads by way of a switch, and the technology disclosed in Patent Document 2 also requires a switch that switches the two electric storage devices as a power supplying source for the excitation control circuit; therefore, there has been a problem that the system structure becomes complex and the cost increases.

Furthermore, in the technology disclosed in Patent Document 3, in order that the MOSFET-formed semiconductor switch in the DC/DC converter is made to be always on and the output and input voltages of the DC/DC converter are made to be equal to each other so that the low-voltage side and the high-voltage side communicate with each other, a circuit, for example, a buffer circuit for supply a stable electric potential (gate threshold voltage) to the gate terminal of the MOSFET is required; therefore, there has been a problem that the system structure becomes complex and the cost increases.

In the technology disclose in Patent Document 4, the smoothing capacitor or the DC/DC converter, which is inserted between the first electric storage device and the second electric storage device and can perform bidirectional step-up and step-down, is required; therefore, there has been a problem that the cost increases.

Moreover, in the technology disclosed in each of Patent Documents 1 through 3, in a system where a high-voltage electric storage device, an electric power generator having a magnetic-field winding, and a magnetic-field circuit are connected with the high-voltage side of a DC/DC converter configured to be capable of performing voltage conversion between the two electric storage devices having different voltages, and electric power generated by the electric power generator is supplied by way of the DC/DC converter to electric loads and the low-voltage electric storage device connected with the low-voltage side of the DC/DC converter, there has been a problem that while the high-voltage electric storage device fails and is shut down, it is not made possible that after a low-voltage electric storage device supplies electric power to the high-voltage-side magnetic-field circuit by way of the DC/DC converter, the electric power generated by the high-voltage-side electric power generator is supplied to the low-voltage-side electric load and the low-voltage electric storage device by way of the same DC/DC converter.

When the voltage across the smoothing capacitor becomes a voltage within a predetermined allowable voltage range of the storage voltage of the first electric storage device (high-voltage electric storage device), the opening/closing switch is closed so that the first electric storage device is connected, and the mode of the DC/DC converter is switched from the step-up mode to the step-down mode; however, when the high-voltage electric storage device fails and is shut down, i.e., when the high-voltage electric storage device cannot be connected, the conventional technology disclosed in Patent Document 4 cannot be utilized.

A DC/DC converter is designed with the input allowable voltage range specified; however, in the technology disclosed in Patent Document 4, the input allowable voltage range of the DC/DC converter is not taken into consideration in terms of the predetermined allowable voltage range. In other words, there has been a problem that in the case where when the high-voltage electric storage device fails and is shut down, the generation voltage of the electric power generator is out of the input allowable voltage range of the DC/DC converter, no electric power can be supplied to the low-voltage side electric load and the low-voltage electric storage device.

Furthermore, in the technology disclosed in each of Patent Documents 1 through 4, no method of continuing electric-power generation after the electric-power generation has been started is taken into consideration.

The present invention has been implemented in order to solve the foregoing problems in conventional technologies; the objective thereof is to provide a vehicle power source system that enables an electric power generator to generate electric power without raising the complexity of the system and increasing the cost, even when the high-voltage electric storage device fails and is shut down.

Means for Solving the Problems

A vehicle power source system according to the present invention is characterized by including
a first electric storage device,
a second electric storage device that can store electric power with a voltage higher than that of the first electric storage device,
a current cutoff mechanism that can cut off charging and discharging currents for the second electric storage device,
a low-voltage-side wiring connected with the first electric storage device,
a high-voltage-side wiring connected with the second electric storage device,
an AC power generator that has an armature winding and a magnetic-field winding for generating magnetic flux interlinked with the armature winding and is driven by rotation power of a driving source mounted in a vehicle so as to generate AC electric power across the armature winding,
an electric power converter that is connected with the high-voltage-side wiring and converts the AC electric power generated by the AC power generator into DC electric power so as to supply the DC electric power to the high-voltage-side wiring,
a regulator circuit that is connected with the high-voltage-side wiring and supplies electric power to the magnetic-field winding,
a smoothing capacitor connected in parallel with the electric power converter, and
a DC/DC converter whose high-voltage side and low-voltage side are connected with the high-voltage-side wiring and the low-voltage-side wiring, respectively, and that can perform voltage conversion between the high-voltage side and the low-side voltage side,
characterized in that while the current cutoff mechanism cuts off charging and discharging currents for the second electric storage device, the DC/DC converter is controlled so as to be in a state where electric power is supplied from the low-voltage side to the high-voltage side, applies voltage conversion to an input voltage of the low-voltage side so that an output voltage of the high-voltage side becomes a predetermined voltage, and supplies electric power to the magnetic-field winding based on the predetermined voltage so as to raise an induction voltage across the armature winding of the AC power generator, and
characterized in that after a predetermined state where the induction voltage of the AC power generator can be supplied to the low-voltage side is reached, control of the DC/DC converter is switched from the state where electric power is supplied from the low-voltage side to the high-voltage side to a state where electric power is supplied from the high-voltage side to the low-voltage side, and the DC/DC converter supplies generated electric power based on the induction voltage of the AC power generator to the low-voltage side.

Advantage of the Invention

In the vehicle power source system according to the present invention, even when the high-voltage electric storage device fails and is shut down, electric power is supplied from the low-voltage electric storage device to the magnetic-field circuit by way of the DC/DC converter, without raising the complexity of the system and the cost, so that electric-power generation is started; then, the generated electric power is supplied to electric loads at the low-voltage side and the low-voltage electric storage device by way of the DC/DC converter, so that the electric-power generation can be continued.

BRIEF DESCRIPTION OF THE DRAWINGS

FIG. 3 is a flowchart for explaining part of the operation of the vehicle power source system according to Embodiment 1 of the present invention;
FIG. 10 is a flowchart for explaining part of the operation of the vehicle power source system according to Embodiment 1 of the present invention.

BEST MODE FOR CARRYING OUT THE INVENTION

Figure 1:
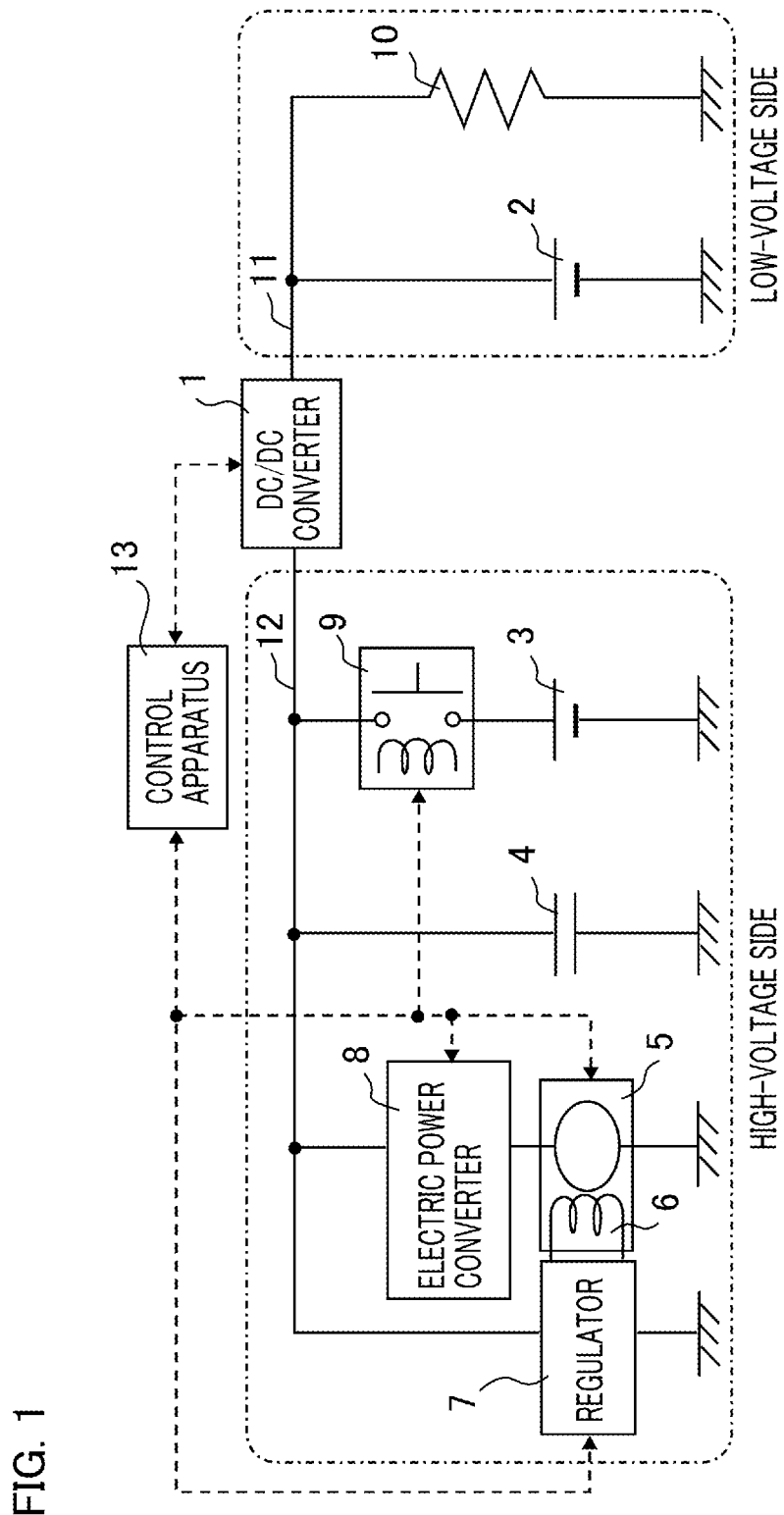
FIG. 1 is a configuration diagram of a vehicle power source system according to Embodiment 1 of the present invention.

Hereinafter, a vehicle power source system and a preferred embodiment according to the present invention will be explained with reference to the drawings; in each of the drawings, the same or similar constituent elements are designated by the same reference characters.

Embodiment 1

FIG. 1 is a configuration diagram of a vehicle power source system according to Embodiment 1 of the present invention. In FIG. 1, the vehicle power source system is controlled by a control apparatus 13 and is provided with a first electric storage device 2; a second electric storage device 3 having a higher voltage than the first electric storage device 2; a current cutoff mechanism 9 that cuts off charging and discharging currents for the second electric storage device 3; low-voltage-side wiring 11 connected with the first electric storage device 2; high-voltage-side wiring 12 connected with the second electric storage device 3; an motor generator 5 that is connected with the high-voltage-side wiring 12, that has a magnetic-field winding 6, and that can operate as an AC power generator that is driven by rotation power of an internal combustion engine or the like as a driving source for an unillustrated vehicle so as to generate AC electric power; a regulator 7 that is connected with the high-voltage-side wiring 12 and supplies electric power to the magnetic-field winding 6; an electric power converter 8 that converts AC electric power generated by the motor generator 5 into DC electric power and supplies the DC electric power to the high-voltage-side wiring 12; a smoothing capacitor 4 connected in parallel with the electric power converter 8; and a DC/DC converter 1 that is configured as being capable of performing voltage conversion between the high-voltage side connected with the high-voltage-side wiring 12 and the low-voltage side connected with the low-voltage-side wiring 11.

The vehicle power source system is configured for the purpose of generating electric power by the motor generator 5, storing the generated electric power, supplying electric power to an electric load 10 mounted in the vehicle, driving the internal combustion engine by the motor generator 5, and motor-running of the vehicle by the motor generator 5. In FIG. 1, the control apparatus 13 is configured in such a way that a single control apparatus controls a plurality of devices, i.e., the DC/DC converter 1, the motor generator 5, the regulator 7, the electric power converter 8, and the current cutoff mechanism 9; however, a plurality of control apparatuses may control a plurality of devices. Moreover, in FIG. 1, each of the first electric storage device 2 and the second electric storage device 3 is illustrated as a single cell; however, at least one of these storage devices may be configured with a plurality of cells.

In general, as the electric storage device, a lithium ion battery, a capacitor, a lead battery, or the like is utilized; in the vehicle power source system according to Embodiment 1 of the present invention, as the first electric storage device 2 and the second electric storage device 3, a lead battery and a lithium ion battery, respectively, are utilized. Deceleration regenerative power can efficiently be stored by use of a lithium ion battery conforming to a high voltage.

In the vehicle power source system according to Embodiment 1 of the present invention, the low-voltage-side wiring 11, the first electric storage device 2, and the electric load 10 configure the low-voltage side, and the high-voltage-side wiring 12, the second electric storage device 3, the smoothing capacitor 4, the motor generator 5, the magnetic-field winding 6, the regulator 7, the electric power converter 8, and the current cutoff mechanism 9 configure the high-voltage side.

The motor generator 5 that is driven by an internal combustion engine so as to generate electric power is connected with the high-voltage-side wiring 12; the electric power converter 8 converts AC electric power generated by the motor generator 5 into DC electric power and supplies the electric DC power to the high-voltage-side wiring 12. Furthermore, by means of the smoothing capacitor 4 connected in parallel with the electric power converter 8, stable DC electric power is stored in the second electric storage device 3 and is supplied to the DC/DC converter 1. When the motor generator 5 stops or the power consumption amount in the electric load 10 becomes larger than the generation power amount of the motor generator 5, the electric power stored in the second electric storage device 3 is supplied to the DC/DC converter 1.

Next, the DC/DC converter 1 converts high-voltage electric power supplied by way of the high-voltage-side wiring 12 into low-voltage electric power, charges the first electric storage device 2 with the low-voltage electric power by way of the low-voltage-side wiring 11, and supplies the low-voltage electric power to the electric load 10. When the DC/DC converter 1 stops or the power consumption amount in the electric load 10 becomes larger than the electric power supplied from the DC/DC converter 1, the electric power stored in the first electric storage device 2 is supplied to the electric load 10. Furthermore, in order to drive the DC/DC converter 1, electric power stored in the first electric storage device 2 is supplied to the DC/DC converter 1.

Next, the operation of the motor generator 5 will be explained. At first, the regulator 7 supplies, as a magnetic-field current, the electric power stored in the second electric storage device 3 to the magnetic-field winding 6; then, the motor generator 5 starts to generate electric power. After the motor generator 5 starts to generate electric power, the electric power generated by the motor generator 5 is supplied, as a magnetic-field current, to the magnetic-field winding 6; thus, the motor generator 5 can continue electric-power generation. Hereinafter, this state will be referred to as autonomous power generation.

The motor generator 5 is driven by an internal combustion engine so as to generate electric power; however, for example, except the case where the electric storage amount of the electric storage device is low, the motor generator 5, in general, stops generation of electric power in order to reduce the fuel consumption amount, except for performing deceleration regenerative power generation.

The second electric storage device 3 supplies electric power to the motor generator 5 by way of the electric power converter 8, so that the motor generator 5, as a motor, can be driven. The motor generator 5, as a motor, is driven; thus, instead of an unillustrated starter, the motor generator 5 can start the internal combustion engine, can drive or supplementarily drive the internal combustion engine, and can perform motor-drive of a vehicle. Embodiment 1 of the present invention will be explained in which a motor generator is utilized; however, it may be allowed that instead of the motor generator, an AC power generator, which, as a motor, is not driven, is utilized.

Next, the operation of the DC/DC converter 1 will be explained. The DC/DC converter 1 is configured in such a way that it is made possible to perform voltage conversion between the high-voltage side connected with the high-voltage-side wiring 12 and the low-voltage side connected with the low-voltage-side wiring 11.

The DC/DC converter 1 receives, as the input electric power thereof, electric power generated by the motor generator 5 or electric power discharged by the second electric storage device 3, steps down the voltage of the input electric power, and supplies the voltage-reduced electric power, as the output electric power thereof, to the low-voltage side connected with the low-voltage wiring 11. Then, the output electric power is stored in the first electric storage device 2 and is supplied to the electric load 10.

Next, a designing method for the high-voltage-side input voltage of the DC/DC converter 1 will be explained. For example, in the case where as the second electric storage device 3, a lithium ion battery consisting of 15 cells having a usable voltage range of 1.6 V through 4.0 V is utilized, the usable voltage range of the second electric storage device 3 is from 24 V to 60 V. In this situation, for example, the high-voltage-side input voltage of the DC/DC converter 1 is designed to be 24 V through 60 V.

The DC/DC converter 1 in Embodiment 1 of the present invention has a function of step-down conversion from a high voltage to a low voltage and a function of step-up conversion from a low voltage to a high voltage; another embodiment will be described later.

Next, the operation of the smoothing capacitor 4 will be explained. The smoothing capacitor 4 charges the smoothing capacitor 4 with electric charges or discharge electric charges stored in the smoothing capacitor so that the voltage that is generated by the motor generator 5 and then is converted into a DC voltage by the electric power converter 8 is suppressed from fluctuating. The smoothing capacitor 4 is charged with electric charges including electric charges discharged by the second electric storage device 3, electric charges generated by the motor generator 5, and electric charges outputted from the DC/DC converter 1.

In general, the uncharged smoothing capacitor 4 is supplied with electric power by the second electric storage device 3, by way of an unillustrated bypass route connected in parallel with the current cutoff mechanism 9, so that it is initially charged. In this situation, a resistor is connected in series with the bypass route so that the amount of the charging current is smaller than the one that breaks the smoothing capacitor 4. A current cutoff mechanism is provided also in the bypass route so that when as described later, the second electric storage device 3 is abnormal or diagnosed, the charging and discharging currents for the second electric storage device 3 is cut off.

Next, the operation of the current cutoff mechanism 9 will be explained. When, for example, the second electric storage device 3 is abnormal or diagnosed, the current cutoff mechanism 9 cuts off charging and discharging currents for the second electric storage device 3. In this situation, the state where the second electric storage device 3 is abnormal denotes, for example, the case where the lithium ion battery is excessively charged or generates abnormal heat; in that case, because the lithium ion battery may emit smoke or catch fire, it is required to cut off the charging and discharging currents as soon as possible. The state where the second electric storage device 3 is diagnosed denotes, for example, the case where the failure diagnosis of the vehicle power source system is implemented or the open circuit voltage (hereinafter, referred to as an OCV) of the lithium ion battery is measured; for example, the OCV measurement for the lithium ion battery is implemented with the charging and discharging currents for the lithium ion battery cut off.

In the case where when the motor generator 5 has stopped electric-power generation, the current cutoff mechanism 9 cuts off the charging and discharging currents for the second electric storage device 3, the high-voltage side connected with the high-voltage-side wiring 12 has no electric power to be supplied to the magnetic-field winding 6 and hence electric-power generation cannot be started. The measures therefor will be described later.

Next, as far as the vehicle power source system according to Embodiment 1 of the present invention is concerned, with reference to the flowchart in FIG. 3, there will be explained the case where when the second electric storage device 3 is abnormal and hence the current cutoff mechanism 9 cuts off the charging and discharging currents for the second electric storage device 3, the first electric storage device 2 supplies electric power to the regulator 7 by way of the DC/DC converter 1 so that electric-power generation is started, the generated electric power is supplied to the electric load 10 and the first electric storage device 2 by way of the DC/DC converter 1 so that the electric-power generation is further continued.

FIG. 3 is a flowchart for explaining part of the operation of a vehicle power source system according to Embodiment 1 of the present invention. In FIG. 3, at first, in the step S301, it is determined whether or not the second electric storage device 3 is abnormal. In the case where in the step S301, the second electric storage device 3 is normal (N), the processing is ended in the step S307. In contrast, in the case where in the step S301, the second electric storage device 3 is abnormal (Y), the step S301 is followed by the step S302, where the current cutoff mechanism 9 immediately cuts off the charging and discharging currents for the second electric storage device 3.

Next, in the step S303, it is determined whether or not the devices (including devices unillustrated in FIG. 1) other than the second electric storage device 3 are normal. In the case where in the step S303, it is determined that any one of the devices other than the second electric storage device 3 is abnormal (N), the processing is ended in the step S307, and fail-safe processing is separately implemented. In contrast, in the case where in the step S303, it is determined that the devices other than the second electric storage device 3 are normal (Y), it is further determined in the step S304 whether or not the motor generator 5 is generating electric power.

In the case where in the step S304, it is determined that the motor generator 5 is generating electric power (Y), the regulator 7 provides the electric power, as a magnetic-field current, generated by the motor generator 5 to the magnetic-field winding 6 by way of the electric power converter 8. As a result, the motor generator 5 can continue autonomous power generation. In this situation, the electric power generated by the motor generator 5 is adjusted by the control apparatus 13 so as to become a magnetic-field current If that can maintain the autonomous power generation. The adjustment method for the magnetic-field current If will be described later.

In the step S305, various kinds of prohibition conditions are implemented. In Embodiment 1 of the present invention, an idling stop prohibition and a motor-drive prohibition for the motor generator 5 are implemented so that the motor generator 5 is not utilized for any other purpose than electric-power generation. Next, in the step S306, the electric-power generation is prohibited from being stopped so that while the current cutoff mechanism 9 cuts off the charging and discharging currents for the second electric storage device 3, the electric-power generation is continued until the internal combustion engine stops. Next, the processing is ended in the step S307.

In contrast, in the case where in the step S304, it is determined that the motor generator 5 is not generating electric power (N), the step S304 is followed by the step S308, where a power generation start command is issued to the motor generator 5. However, because at this moment, the charging and discharging currents for the second electric storage device 3 is cut off in the step S302, no magnetic-field current is supplied to the magnetic-field winding 6 and hence electric-power generation is not started.

Next, in the step S309, the state of the DC/DC converter 1 is turned to the one where electric power is supplied from the low-voltage side to the high-voltage side so that the high-voltage-side output voltage Vdch of the DC/DC converter 1 becomes a predetermined voltage Vz. At this moment, a low-voltage-side input voltage Vdcl of the DC/DC converter 1 is supplied by the first electric storage device 2. The predetermined voltage Vz for the high-voltage-side output voltage Vdch of the DC/DC converter 1 will be described later.

Next, in the step S310, the regulator 7 supplies a magnetic-field current to the magnetic-field winding 6, based on the high-voltage-side output voltage Vdch of the DC/DC converter 1; thus, the induction voltage of the motor generator 5 increases. In this situation, the regulator 7 adjusts the magnetic-field current to the magnetic-field current If with which the motor generator 5 can perform autonomous electric-power generation. In Embodiment 1 of the present invention, an unillustrated current sensor in the motor generator 5 measures the magnetic-field current If; the motor generator 5 notifies the control apparatus 13 of the measurement; the control apparatus 13 controls the regulator 7 so as to adjust the magnetic-field current If.

Next, in the step S311, it is determined whether or not the motor generator 5 has come into a predetermined state where electric power can be supplied to the low-voltage side. The predetermined state will be described later. In the case where in the step S311, it is determined that the motor generator 5 has come into the predetermined state where electric power can be supplied to the low-voltage side (Y), in the step S312, the mode of the DC/DC converter 1 is turned to the one where electric power is supplied from the high-voltage side to the low-voltage side so that a low-voltage-side output voltage Vdcl of the DC/DC converter 1 becomes low-voltage-side voltage V1. The low-voltage-side voltage V1 is within a voltage range up to which the first electric storage device 2 can charge. The first electric storage device 2 in Embodiment 1 of the present invention is formed of a lead battery; for example, the low-voltage-side voltage V1 is 11.6 V through 12.7 V or higher that is the OCV of the lead battery. The DC/DC converter 1 makes the low-voltage-side output voltage to be the same as or higher than the voltage of the first electric storage device 2, i.e., the same as or higher than the low-voltage-side voltage V1 so that the first electric storage device 2 can be charged. Next, the processing is ended in the step S307.

In contrast, in the case where in the step S311, it is determined that the motor generator 5 has not come into the predetermined state where electric power can be supplied to the low-voltage side (N), it is regarded that the motor generator 5 cannot continue electric-power generation, and the operation of the DC/DC converter 1 is not switched; then, the processing is ended in the step S307.

Here, a preferred example of the predetermined voltage Vz will be explained. As a preferred example of the predetermined voltage Vz, it is assumed that the predetermined voltage Vz is within a constant voltage range Vrng, described below. The constant voltage range Vrng is a constant voltage range of the high-voltage-side input voltage of the DC/DC converter 1, i.e., 24 V through 60 V that is the usable voltage range of the second electric storage device 3, for example, a lithium ion battery.

Figure 13:
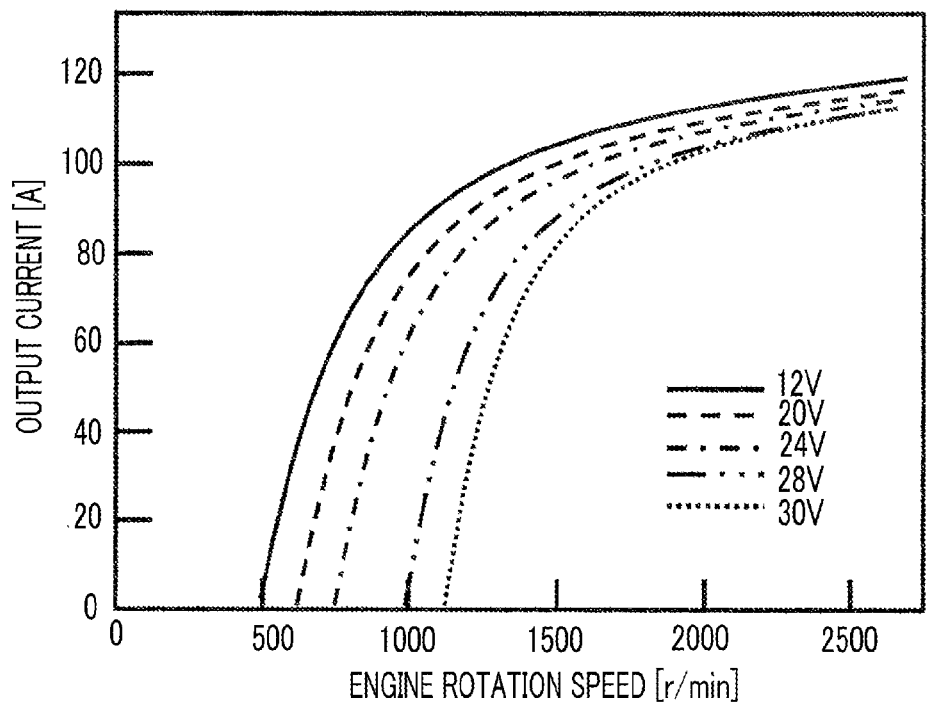
FIG. 13 is a characteristic graph representing the relationship between the engine rotation speed and the output current of a motor generator in the vehicle power source system according to Embodiment 1 of the present invention.

Furthermore, as a preferred example of the predetermined voltage Vz, in order to secure a large engine rotation region where electric power can be generated, the predetermined voltage Vz is set to the lowest voltage within the constant voltage range Vrng. The reason for that will be explained below. FIG. 13 is a characteristic graph representing the relationship between the engine rotation speed of the motor generator and the output current in the vehicle power source system according to Embodiment 1 of the present invention; the ordinate denotes the output current [A], and the abscissa denotes the engine rotation speed [r/min]; FIG. 13 represents the relationship between the engine rotation speed of the motor generator 5 and the output current when the magnetic-field current If is fixed to 10 A and the B-terminal voltage to be supplied to the motor generator 5 is varied. As can be seen from the characteristic graph in FIG. 13, in the case where with the lower B-terminal voltage, electric power can be generated from the lower engine rotation speed.

For example, when the B-terminal voltage is 30 V, electric power can be generated with an engine rotation speed of 1125 [r/min] or higher; when the B-terminal voltage is 28 V, electric power can be generated with an engine rotation speed of 1000 [r/min] or higher; when the B-terminal voltage is 24 V, electric power can be generated with an engine rotation speed of 750 [r/min] or higher; when the B-terminal voltage is 20 V, electric power can be generated with an engine rotation speed of 625 [r/min] or higher; when the B-terminal voltage is 12 V, electric power can be generated with an engine rotation speed of 500 [r/min] or higher. In this case, for example, in a vehicle with a limb-home idling rotation speed of 1000 [r/min], electric power cannot be generated during idling when the B-terminal voltage is 30 V. In this situation, because the minimum voltage in the constant voltage range Vrng of Embodiment 1 of the present invention is 24 V, electric-power generation can be continued with the engine rotation speed of 750[r/min] or higher when the B-terminal voltage is 24 V; thus, in comparison with the case where the limb-home idling rotation speed is 1000 [r/min], a margin of 250[r/min] can be provided and hence electric power can stably be generated even at a time of idling.

While the current cutoff mechanism 9 cuts off the charging and discharging currents for the second electric storage device 3, the B-terminal voltage to be supplied to the motor generator 5 is the high-voltage-side output voltage Vdch of the DC/DC converter 1 supplied from the first electric storage device 2 or the voltage Vaddc that is generated by the motor generator 5 and is converted by the electric power converter 8.

As described above, when the predetermined voltage Vz is set to the minimum voltage in the constant voltage range Vrng, the opportunity for electric-power generation is prevented from decreasing or electric-power generation can be continued even when the engine rotation speed is low.

Furthermore, as a preferred example of the predetermined voltage Vz, the predetermined voltage Vz is adjusted to a voltage at which the product of the power generation efficiency of the motor generator 5, the conversion efficiency of the electric power converter 8, and the voltage conversion efficiency of the DC/DC converter 1 at a time when the motor generator 5 generates electric power and the electric power is supplied to the low-voltage-side wiring 11 by way of the electric power converter 8 and the DC/DC converter 1 becomes maximum.

Figure 14:
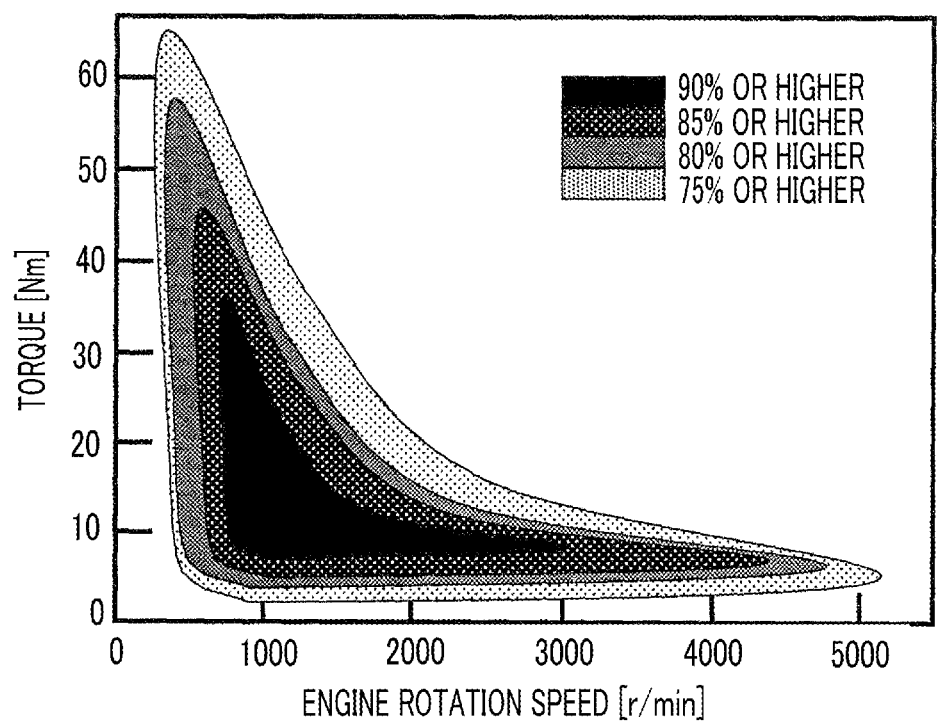
FIG. 14 is a characteristic graph representing the power generation efficiency of the motor generator in the vehicle power source system according to Embodiment 1 of the present invention.

FIG. 14 is a characteristic graph representing the power generation efficiency of the motor generator in the vehicle power source system according to Embodiment 1 of the present invention; the ordinate denotes the driving torque [Nm], and the abscissa denotes the engine rotation speed. As can be seen from FIG. 14, the power generation efficiency is high in a certain region where the engine rotation speed is low and the driving torque of the motor generator 5 is small.

Figure 15:
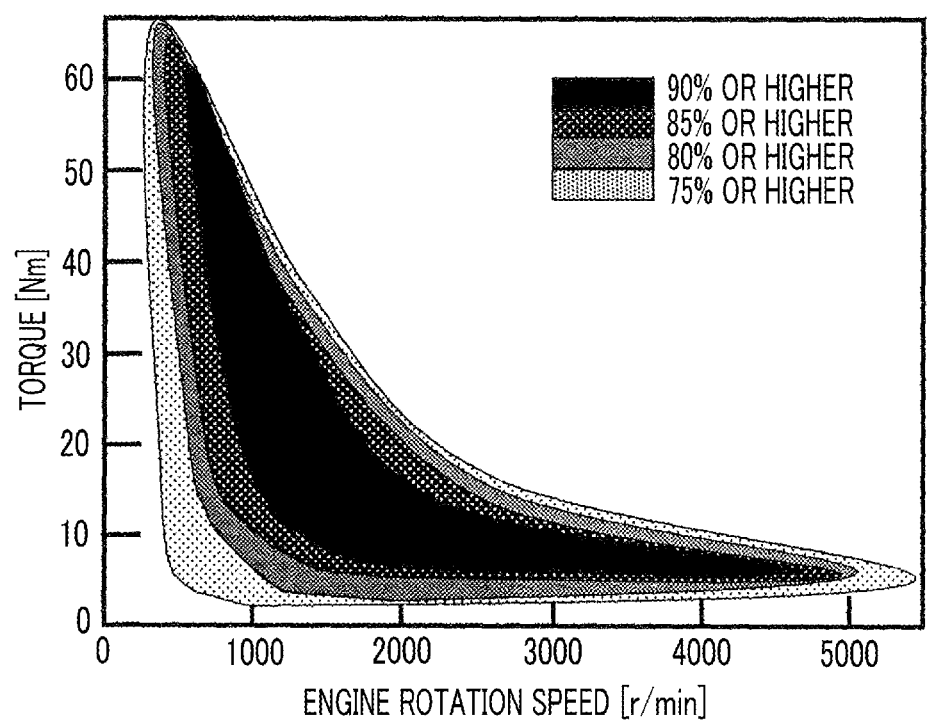
FIG. 15 is a characteristic graph representing the power generation efficiency of the electric power converter in the vehicle power source system according to Embodiment 1 of the present invention.

FIG. 15 is a characteristic graph representing the electric-power conversion efficiency of the electric power converter in the vehicle power source system according to Embodiment 1 of the present invention; the ordinate denotes the driving torque [Nm], and the abscissa denotes the engine rotation speed. As can be seen from FIG. 15, the power generation efficiency is high in a certain region where the engine rotation speed is low and the driving torque of the motor generator 5 is small.

Figure 16:
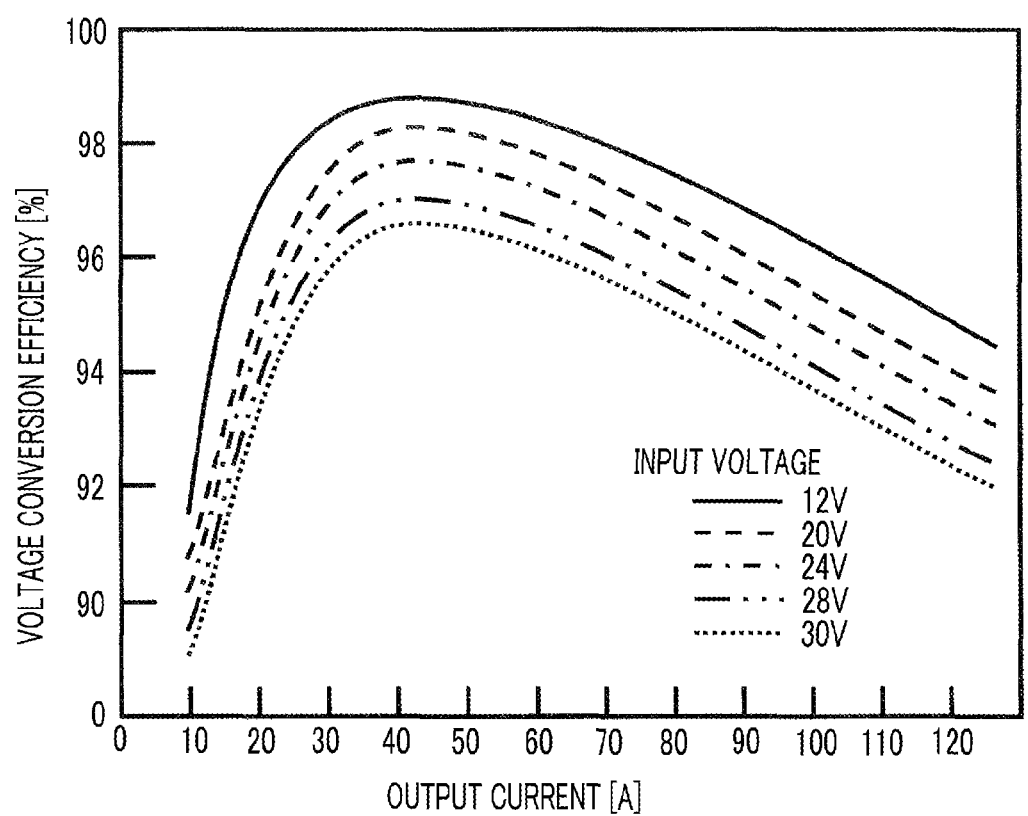
FIG. 16 is a characteristic graph representing the voltage conversion efficiency of the DC/DC converter in the vehicle power source system according to Embodiment 1 of the present invention.

FIG. 16 is a characteristic graph representing the voltage conversion efficiency of the DC/DC converter in the vehicle power source system according to Embodiment 1 of the present invention; the ordinate denotes the voltage conversion efficiency, and the abscissa denotes the output current [A]; FIG. 16 represents the respective voltage conversion efficiencies at different input voltages. As can be seen from FIG. 16, the lower the input voltage is, the higher the voltage conversion efficiency is.

From the foregoing characteristic graphs, the power generation efficiency of the motor generator 5, the conversion efficiency of the electric power converter 8, and the voltage conversion efficiency of the DC/DC converter 1 are obtained based on the driving torque of the motor generator 5, the engine rotation speed, the output current and the input voltage of the electric power converter 8 (i.e., the high-voltage-side output voltage Vdch or the voltage Vaddc of the electric power converter). Then, the product of the power generation efficiency of the motor generator 5, the conversion efficiency of the electric power converter 8, and the voltage conversion efficiency of the DC/DC converter 1 is obtained and the predetermined voltage Vz is adjusted to a voltage at which the product becomes maximum, so that the electric power generated by the motor generator 5 can efficiently be supplied to the low-voltage side.

Furthermore, as a preferred example of the predetermined voltage Vz, the predetermined voltage Vz is set to a smoothing-capacitor voltage Vc of the smoothing capacitor 4 or higher. In this situation, the predetermined voltage Vz is adjusted to a voltage at which the electric potential difference (the electric potential difference between the predetermined voltage Vz and the voltage across the smoothing capacitor 4) is the one that does not break the smoothing capacitor 4. As a result, no large current flows in the smoothing capacitor 4 and hence the smoothing capacitor 4 can be charged without being broken.

Figure 2:
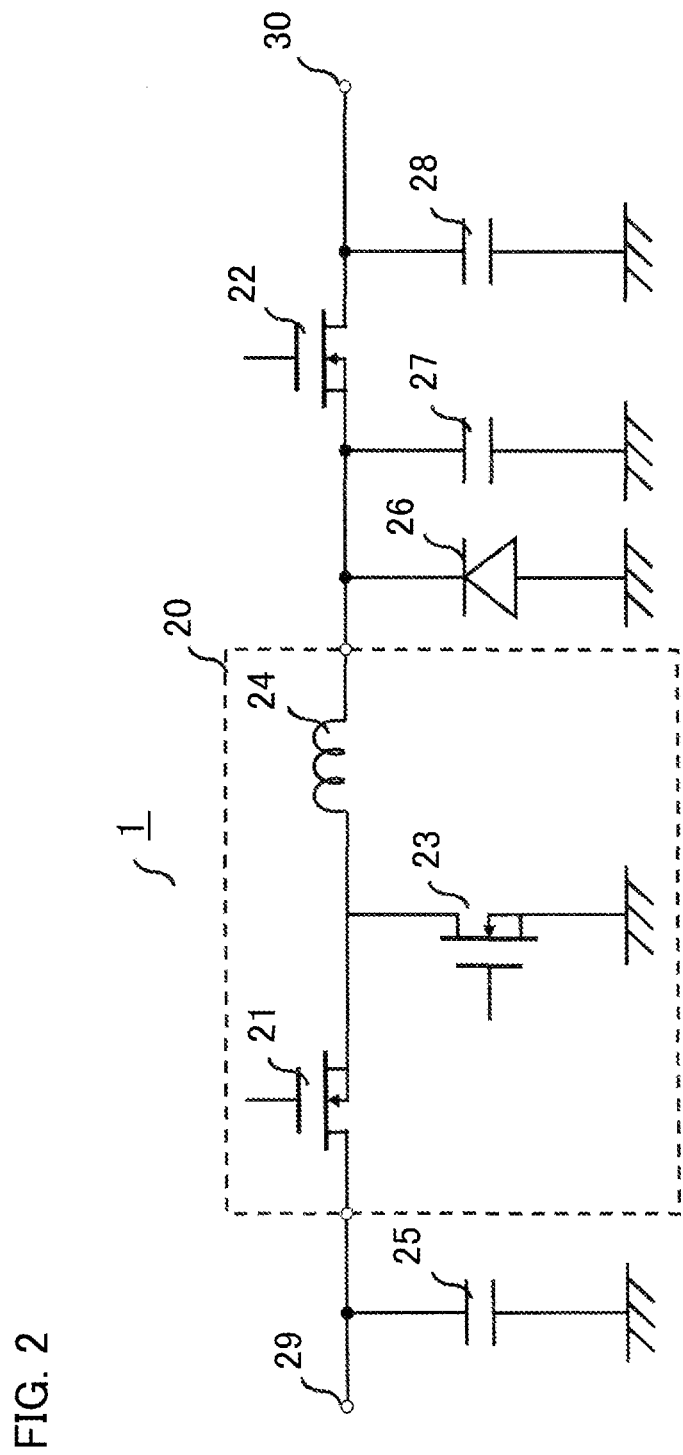
FIG. 2 is a configuration diagram of a DC/DC converter in the vehicle power source system according to Embodiment 1 of the present invention.

Next, the configuration of the DC/DC converter 1 in the vehicle power source system according to Embodiment 1 of the present invention will be explained. FIG. 2 is a configuration diagram of the DC/DC converter 1 in the vehicle power source system according to Embodiment 1 of the present invention. In FIG. 2, the DC/DC converter 1 includes a synchronous-rectification non-insulated step-down DC/DC converter (hereinafter, referred to as a step-down DC/DC converter) 20, an input smoothing capacitor 25 connected in parallel with the step-down DC/DC converter 20 and between the high-voltage-side wiring 29 and the step-down DC/DC converter 20, a circulation diode 26 connected between the low-voltage-side wiring 30 and the step-down DC/DC converter 20, output smoothing capacitors 27 and 28, and a reverse-flow prevention MOSFET 22.

The step-down DC/DC converter 20 includes a chopper MOSFET 21, a circulation MOSFET 23, and a current-smoothing reactor 24.

Next, the operation of the DC/DC converter 1 will be explained. When in the normal mode, step-down from the high-voltage side to the low-voltage side is performed, the DC/DC converter 1 is operated in the following manner. That is to say, at first, an input voltage inputted through the high-voltage-side wiring 29 is stabilized by the input smoothing capacitor 25, the reverse-flow prevention MOSFET 22 connected with the low-voltage side of the step-down DC/DC converter 20 is always kept ON, and switching of the chopper MOSFET 21 in the step-down DC/DC converter 20 is performed, so that the input voltage is stepped down by the current-smoothing reactor 24 and is outputted to the low-voltage-side wiring 30. As the circulation MOSFET 23 that performs synchronous rectification, a diode may be utilized; however, in order to prevent a diode loss, a MOSFET is utilized.

Next, step-up from the low-voltage side to the high-voltage side is performed, the DC/DC converter 1 is operated in the following manner. That is to say, at first, an input voltage inputted through the low-voltage-side wiring 30 is stabilized by the smoothing capacitors 27 and 28, the reverse-flow prevention MOSFET 22 connected with the low-voltage side of the step-down DC/DC converter 20 is always kept ON, and alternate switching between the chopper MOSFET 21 and the circulation MOSFET 23 in the step-down DC/DC converter 20 is performed, so that the input voltage is stepped up by the current-smoothing reactor 24 and is outputted to the high-voltage-side wiring 29. In this situation, the chopper MOSFET 21 in the step-down DC/DC converter 20 functions as the diode in a step-up circuit.

Next, step-down from the low-voltage side to the high-voltage side is performed, the DC/DC converter 1 is operated in the following manner. At first, an input voltage inputted through the low-voltage-side wiring 30 is smoothed by the smoothing capacitors 27 and 28, the chopper MOSFET 21 in the step-down DC/DC converter 20 is always kept ON, the circulation MOSFET 23 is always kept OFF, the circulation diode 26 is added to the low-voltage side of the step-down DC/DC converter 20, and switching of the reverse-flow prevention MOSFET 22 is performed, so that the input voltage is stepped down by the current-smoothing reactor 24 and is outputted to the high-voltage-side wiring 29.

The DC/DC converter 1 is configured and operated in such a manner as described above, so that the step-down DC/DC converter 20 can inexpensively be utilized as a bidirectional DC/DC converter.

In Embodiment 1 of the present invention, the reverse-flow prevention MOSFET 22 is turned off when an unillustrated current sensor in the DC/DC converter 1 detects a reverse flow. As the reverse-flow prevention MOSFET 22, a diode may be utilized; however, in order to prevent a diode loss, a MOSFET is utilized.

Figure 12:
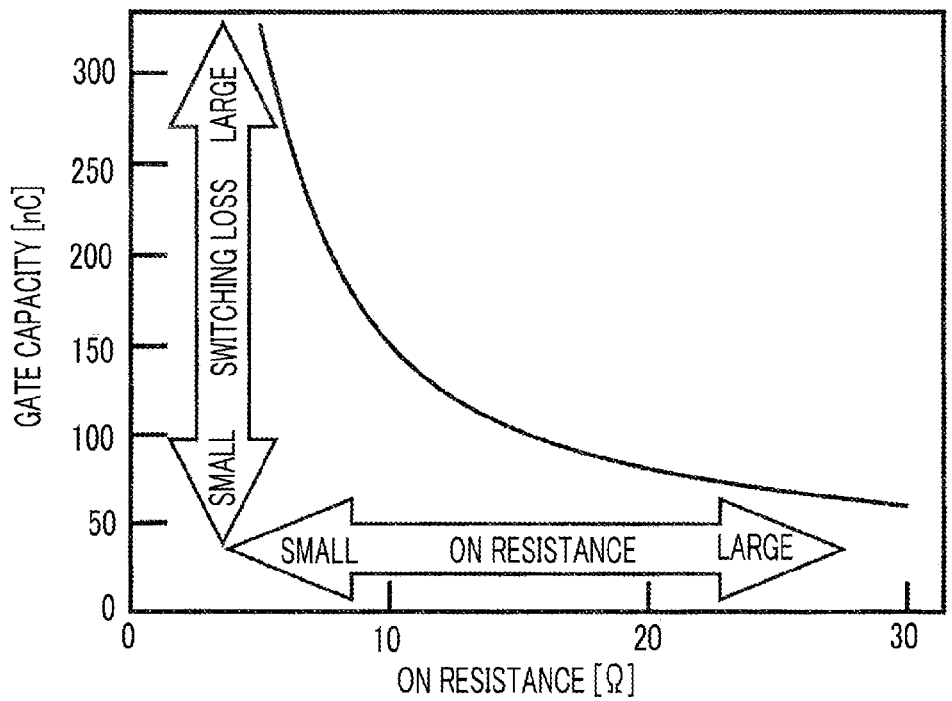
FIG. 12 is a characteristic graph representing the relationship between the ON resistance value and the gate capacitance value of a MOSFET.

FIG. 12 is a characteristic graph representing the relationship between the ON resistance value and the gate capacitance value of a MOSFET; the trade-off relationship between the On resistance and the gate resistance (Qg–RDS(ON)) of the MOSFET is represented; the ordinate denotes the gate capacitance [nC] and the abscissa denotes the ON resistance [Ω]. As represented in FIG. 12, as far as the characteristic of a MOSFET is concerned, the smaller the ON resistance is, the larger the gate capacitance becomes, and the smaller the gate capacitance is, the larger the ON resistance becomes. The switching loss becomes larger as the gate capacitance becomes larger.

The conduction loss caused by the ON resistance of a device occupies the majority of the power loss in a power MOSFET utilized in switching of a power supply line; therefore, the characteristic that is regarded as the most important is the ON resistance and hence a MOSFET having a small ON resistance is selected. In contrast, in the case of high-speed switching, it is required to select a MOSFET having a small switching loss, i.e., a small gate capacitance.

From the foregoing characteristic of a MOSFET, as a preferred example, selection of the MOSFETs in FIG. 2 is implemented in the following manner. That is to say, normally, the chopper MOSFET 21 and the circulation MOSFET 23 in the step-down DC/DC converter 20 are utilized for switching; therefore, MOSFETs having a small switching loss are selected and are not changed even in Embodiment 1. In Embodiment 1, although the reverse-flow prevention MOSFET 22 is utilized for switching in the case where step-down from the low-voltage side to the high-voltage side is performed, the case is few; because in most cases, the reverse-flow prevention MOSFET 22 is utilized in the mode where it is always ON, a MOSFET having a small ON resistance is selected and is not changed in Embodiment 1.

Figure 4A:
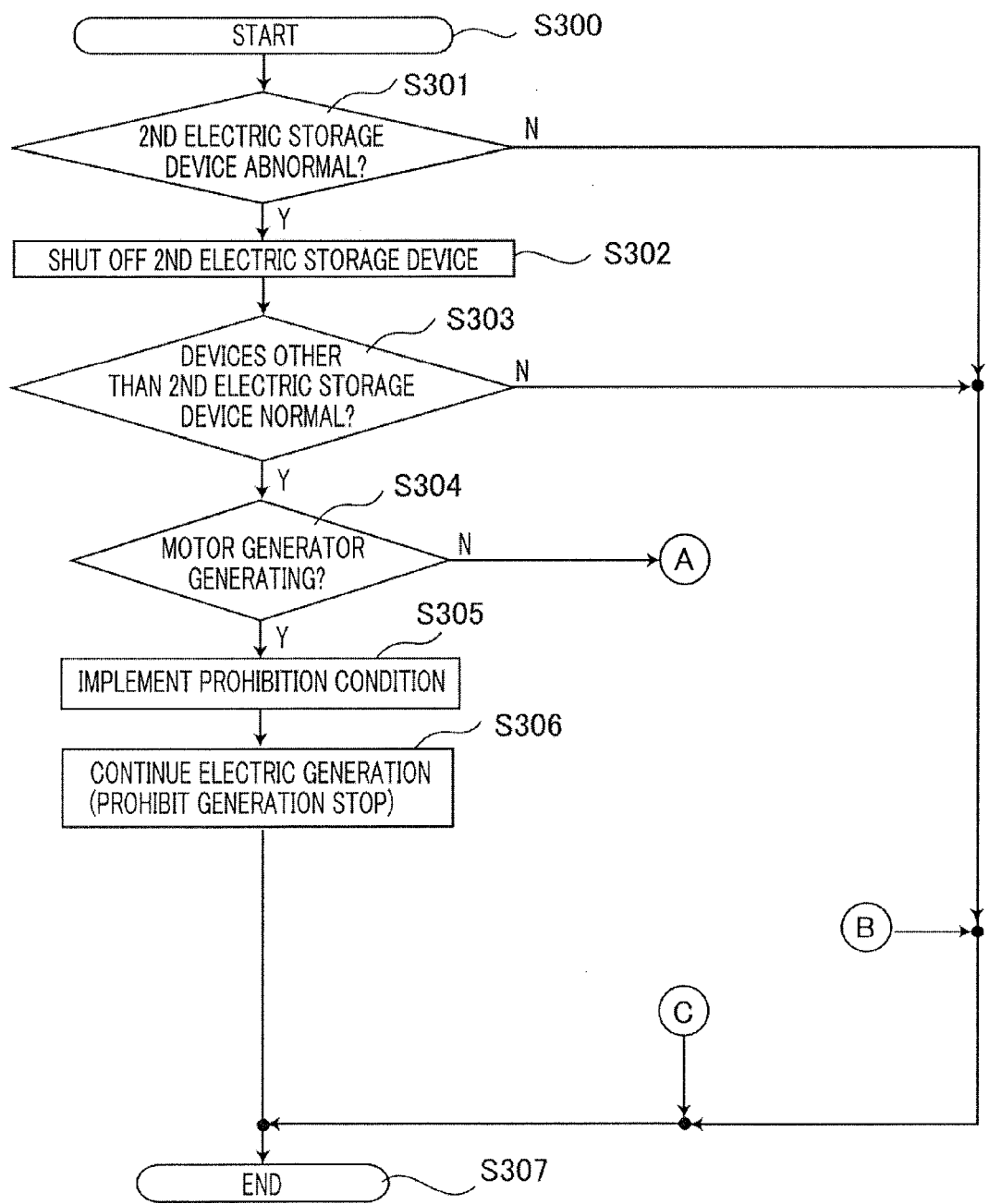
FIG. 4A and FIG. 4B are flowcharts for explaining part of the operation of the vehicle power source system according to Embodiment 1 of the present invention.
Figure 4B:
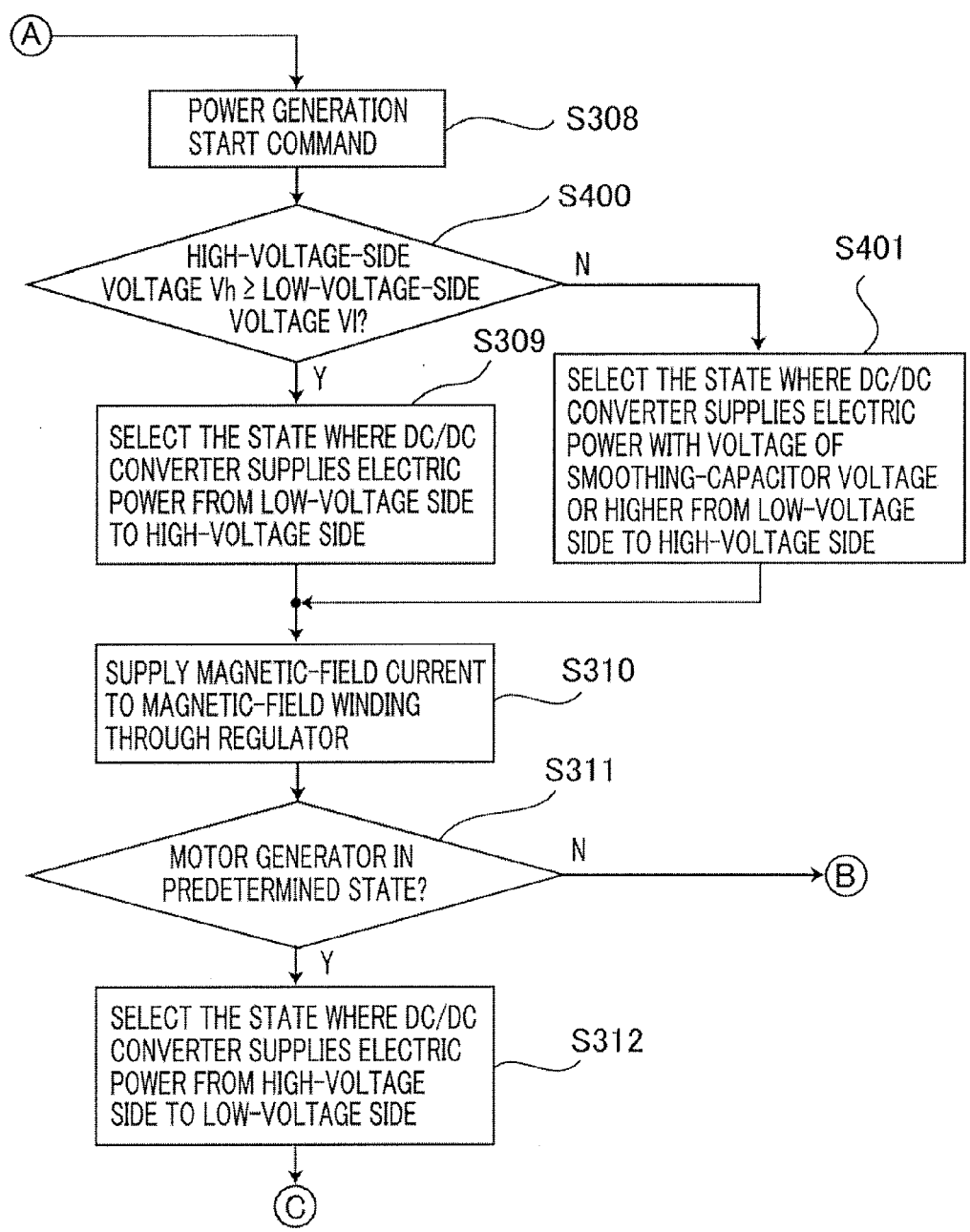

Next, with reference to the flowchart in FIG. 4A and FIG. 4B, there will be explained the operation in which based on the result of comparison between a high-voltage-side voltage Vh and the low-voltage-side voltage V1, the DC/DC converter is switched so that the predetermined voltage Vz is obtained. FIG. 4A and FIG. 4B are flowcharts for explaining part of the operation of a vehicle power source system according to Embodiment 1 of the present invention. The steps S300 through S308 in FIG. 4A and FIG. 4B are the same as those in FIG. 3.

In FIG. 4A and FIG. 4B, after the power generation start command is issued in the step S308, it is determined in the step S400 whether or not the high-voltage-side voltage Vh of the high-voltage-side wiring 12 is the same as or higher than the low-voltage-side voltage V1 of the low-voltage-side wiring 11. In this situation, the high-voltage-side voltage Vh is equivalent to the voltage Vc across the smoothing capacitor 4.

In the case where in the step S400, it is determined that the high-voltage-side voltage Vh of the high-voltage-side wiring 12 is the same as or higher than the low-voltage-side voltage V1 of the low-voltage-side wiring 11 (Y), the step S400 is followed by the step S309, where the mode of the DC/DC converter 1 is switched to the one where electric power is stepped up and supplied from the low-voltage side to the high-voltage side so that the high-voltage-side output voltage Vdch of the DC/DC converter 1 becomes the predetermined voltage Vz.

In the case where in the step S400, it is determined that the high-voltage-side voltage Vh of the high-voltage-side wiring 12 is lower than the low-voltage-side voltage V1 of the low-voltage-side wiring 11 (N), it is conceivable that the smoothing capacitor 4 has not been charged. Accordingly, in the step S401, the mode of the DC/DC converter 1 is switched to the one where electric power is stepped down and supplied from the low-voltage side to the high-voltage side so that the high-voltage-side output voltage Vdch of the DC/DC converter 1, i.e., the predetermined voltage Vz becomes the same as or higher than the voltage Vc across the smoothing capacitor 4.

As the condition in which the smoothing capacitor 4 has not been charged, for example, it is conceivable that before the engine is started, a failure in the second electric storage device 3 is detected, the current cutoff mechanism 9 cuts off the charging and discharging currents for the second electric storage device 3, and hence the smoothing capacitor 4 is not charged.

Next, in the step S310, the regulator 7 supplies, as a magnetic-field current, electric power that has been voltage-converted by the DC/DC converter 1 to the magnetic-field winding 6, so that the motor generator 5 starts to generate electric power. Next, in the step S311, it is determined whether or not the motor generator 5 has come into a predetermined state where electric power can be supplied to the low-voltage side. The predetermined state will be described later.

In the case where in the step S311, it is determined that the motor generator 5 has come into the predetermined state where electric power can be supplied to the low-voltage side (Y), in the step S312, the mode of the DC/DC converter 1 is turned to the one where electric power is supplied from the high-voltage side to the low-voltage side so that the low-voltage-side output voltage Vdcl of the DC/DC converter 1 becomes the low-voltage-side voltage V1. Next, the processing is ended in the step S307.

In the case where in the step S311, it is determined that the motor generator 5 has not come into the predetermined state where electric power can be supplied to the low-voltage side (N), it is regarded that the motor generator 5 cannot continue electric-power generation, and the operation of the DC/DC converter 1 is not switched; then, the processing is ended in the step S307.

When as described above, the smoothing capacitor 4, which has not been charged, is preliminarily and gradually charged with a voltage lower than the low-voltage-side voltage V1, no large current flows in the smoothing capacitor 4 and hence the smoothing capacitor 4 can be charged without being broken, in comparison with the case where electric power is immediately generated with a high voltage and the smoothing capacitor 4 is charged with the generated electric power or the case where the mode of the DC/DC converter 1 is switched to the one where step-up conversion of the low-voltage-side input voltage Vdcl is immediately implemented.

Figure 5:
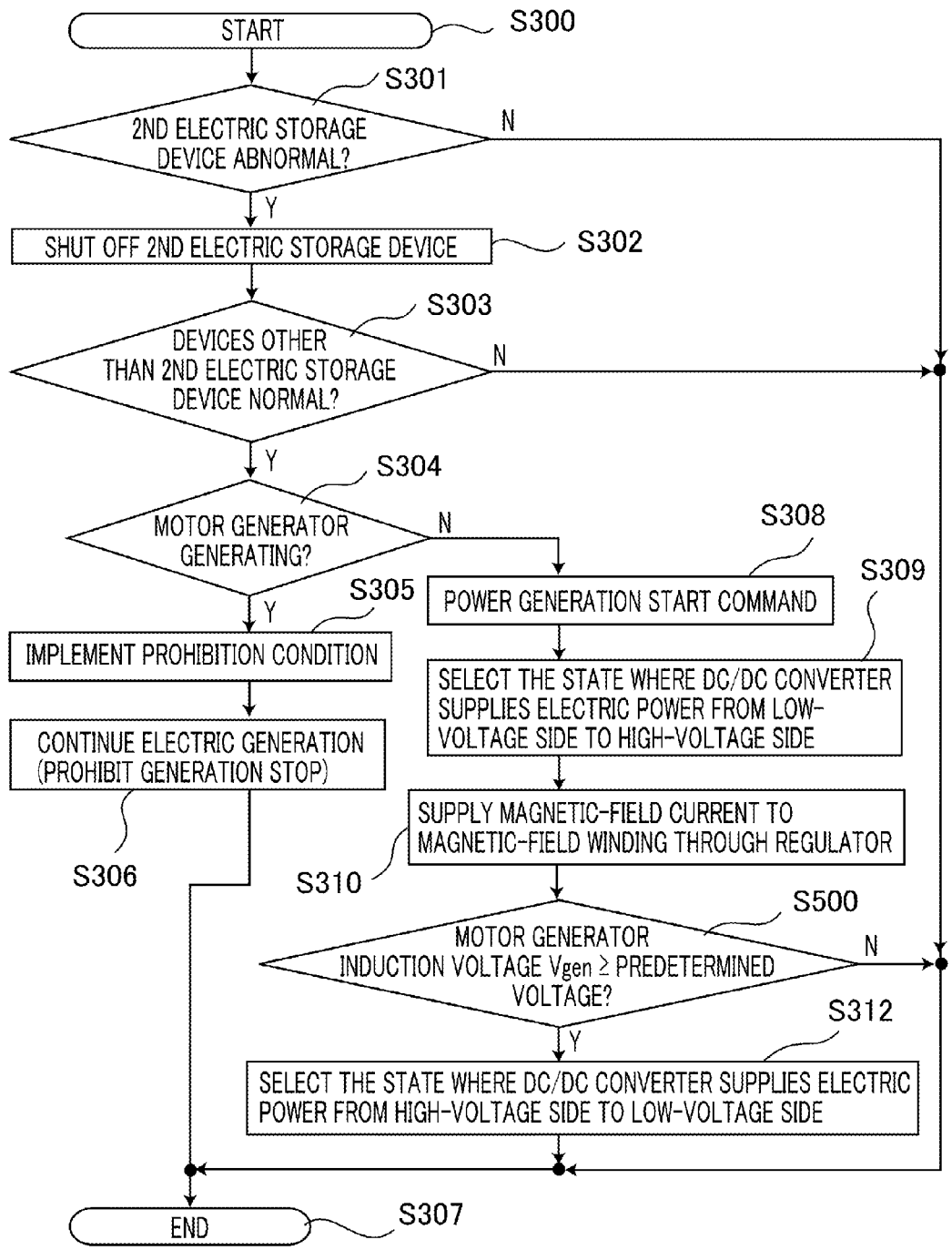
FIG. 5 is a flowchart for explaining part of the operation of the vehicle power source system according to Embodiment 1 of the present invention.

As a preferred example, the predetermined state where the motor generator 5 can supply electric power to the low-voltage side denotes the state where the induction voltage of the motor generator 5 is the predetermined voltage Vz or higher. In this situation, with reference to the flowchart in FIG. 5, there will be explained the operation in which the predetermined state where the motor generator 5 can supply electric power to the low-voltage side, i.e., the state where the induction voltage of the motor generator 5 is the predetermined voltage Vz or higher and the DC/DC converter 1 supplies electric power from the low-voltage side to the high-voltage side is switched to the state where electric power is supplied from the high-voltage side to the low-voltage side. FIG. 5 is a flowchart for explaining part of the operation of the vehicle power source system according to Embodiment 1 of the present invention. The steps S300 through S310 in FIG. 5 are the same as those in FIG. 3.

In the step S500, it is determined whether or not an induction voltage Vgen of the motor generator 5 is the same as or higher than the predetermined voltage Vz. In the case where in the step S500, it is determined that the induction voltage Vgen of the motor generator 5 is the same as or higher than the predetermined voltage Vz (Y), it is regarded that the motor generator 5 can continue electric-power generation, and then in the step S312, the state of the DC/DC converter 1 is switched to the one where electric power is supplied from the high-voltage side to the low-voltage side so that the low-voltage-side output voltage Vdcl of the DC/DC converter 1 becomes the low-voltage-side voltage V1; then, the processing is ended in the step S307.

In the case where in the step S500, it is determined that the induction voltage Vgen of the motor generator 5 is lower than the predetermined voltage Vz (N), it is regarded that the motor generator 5 cannot continue electric-power generation, and the operation of the DC/DC converter 1 is not switched; then, the processing is ended in the step S307.

The foregoing operation makes it possible to prevent the motor generator 5 from stopping electric-power generation when the state where the motor generator 5 supplies electric power from the low-voltage side to the high-voltage side is switched to the state where the motor generator 5 supplies electric power from the high-voltage side to the low-voltage side; therefore, while the high-voltage electric storage device fails and is shut down, it is made possible that after a low-voltage electric storage device supplies electric power to the high-voltage-side magnetic-field circuit byway of the DC/DC converter, the electric power generated by the high-voltage-side electric power generator is supplied to the low-voltage-side electric load and the low-voltage electric storage device by way of the same DC/DC converter.

Figure 6:
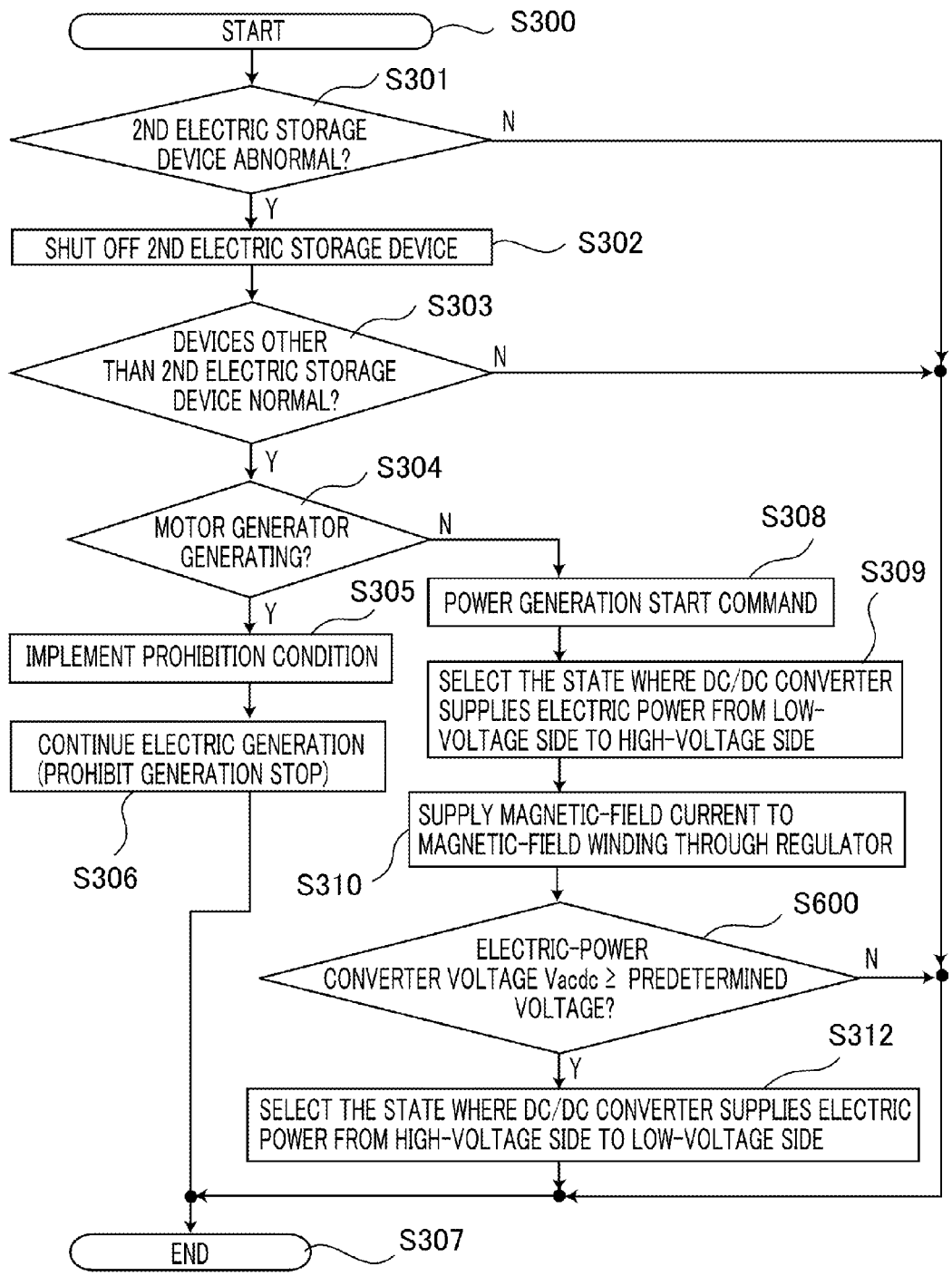
FIG. 6 is a flowchart for explaining part of the operation of the vehicle power source system according to Embodiment 1 of the present invention.

As a preferred example, the predetermined state where the motor generator 5 can supply electric power to the low-voltage side denotes the state where the output voltage to the high-voltage-side wiring 12 of the electric power converter 8 is the predetermined voltage Vz or higher. In this situation, with reference to the flowchart in FIG. 6, there will be explained the operation in which the predetermined state where the motor generator 5 can supply electric power to the low-voltage side, i.e., the state where the output voltage to the high-voltage-side wiring 12 of the electric power converter 8 is the predetermined voltage Vz or higher and the DC/DC converter 1 supplies electric power from the low-voltage side to the high-voltage side is switched to the state where electric power is supplied from the high-voltage side to the low-voltage side. FIG. 6 is a flowchart for explaining part of the operation of the vehicle power source system according to Embodiment 1 of the present invention. The steps S300 through S310 in FIG. 6 are the same as those in FIG. 3.

In FIG. 6, in the step S600, it is determined whether or not an output voltage Vacdc of the electric power converter 8 is the same as or higher than the predetermined voltage Vz. In the case where in the step S600, it is determined that the output voltage Vacdc of the electric power converter 8 is the same as or higher than the predetermined voltage Vz (Y), it is regarded that the motor generator 5 can continue electric-power generation, and then in the step S312, the state of the DC/DC converter 1 is switched to the one where electric power is supplied from the high-voltage side to the low-voltage side so that the low-voltage-side output voltage Vdcl of the DC/DC converter 1 becomes the low-voltage-side voltage V1; then, the processing is ended in the step S307.

In the case where in the step S600, it is determined that the output voltage Vacdc of the electric power converter 8 is lower than the predetermined voltage Vz (N), it is regarded that the motor generator 5 cannot continue electric-power generation, and the operation of the DC/DC converter 1 is not switched; then, the processing is ended in the step S307.

The foregoing operation makes it possible to prevent the motor generator 5 from stopping electric-power generation when the state where the motor generator 5 supplies electric power from the low-voltage side to the high-voltage side is switched to the state where the motor generator 5 supplies electric power from the high-voltage side to the low-voltage side; therefore, while the high-voltage electric storage device fails and is shut down, it is made possible that after a low-voltage electric storage device supplies electric power to the high-voltage-side magnetic-field circuit by way of the DC/DC converter, the electric power generated by the high-voltage-side electric power generator is supplied to the low-voltage-side electric load and the low-voltage electric storage device by way of the same DC/DC converter.

Figure 7:
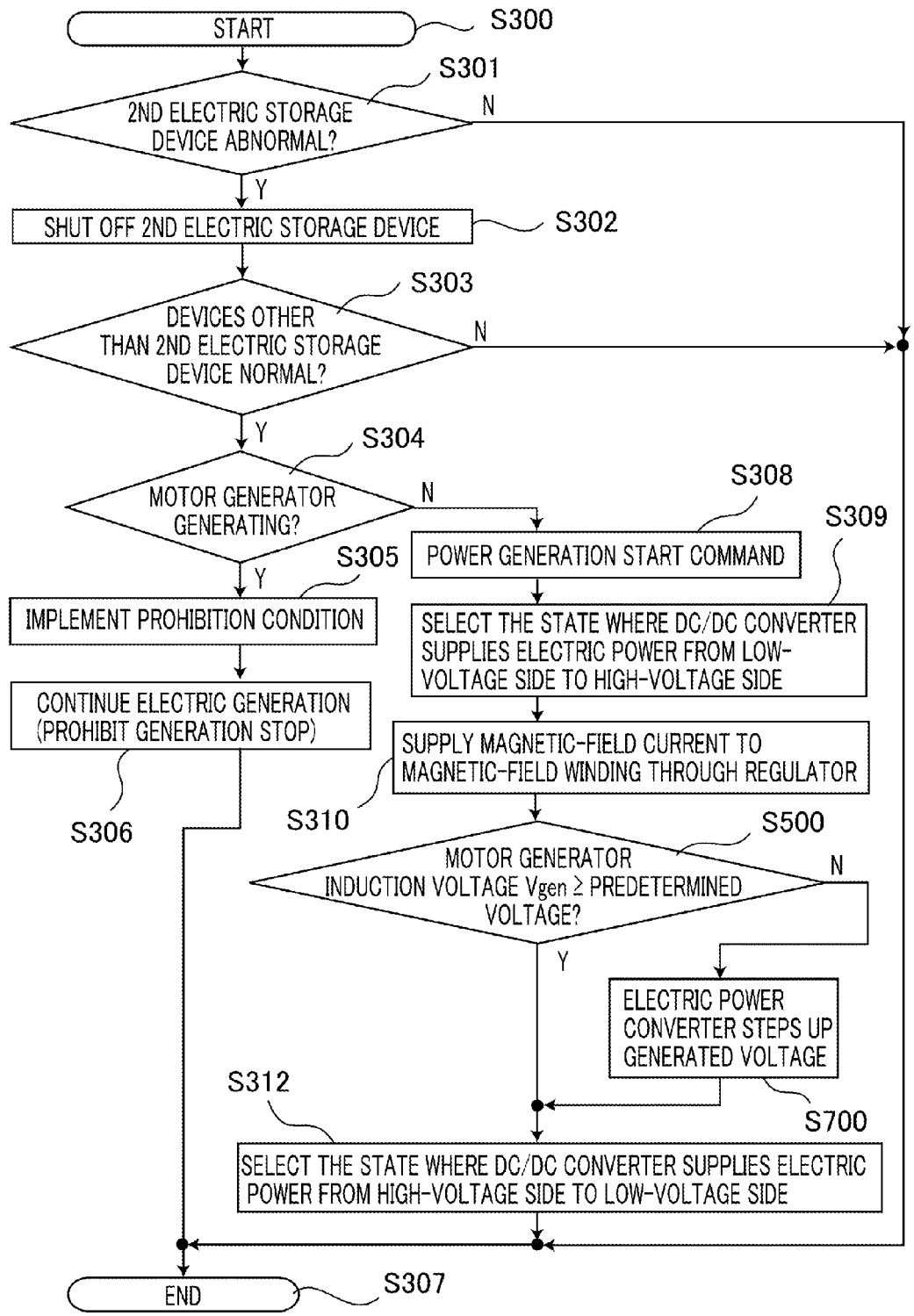
FIG. 7 is a flowchart for explaining part of the operation of the vehicle power source system according to Embodiment 1 of the present invention.

Next, with reference to the flowchart in FIG. 7, there will be explained the operation in which the induction voltage of the motor generator 5 is stepped up to the predetermined voltage Vz or higher by the electric power converter 8 and is supplied to the high-voltage-side wiring 12 and the state where the DC/DC converter 1 supplies electric power from the low-voltage side to the high-voltage side is switched to the state where the DC/DC converter 1 supplies electric power from the high-voltage side to the low-voltage side. FIG. 7 is a flowchart for explaining part of the operation of the vehicle power source system according to Embodiment 1 of the present invention. The steps S300 through S310 in FIG. 7 are the same as those in FIG. 3.

In FIG. 7, in the step S500, it is determined whether or not the motor generator 5 is in the predetermined state, i.e., the induction voltage Vgen of the motor generator 5 is the predetermined voltage Vz or higher. In the case where in the step S500, it is determined that the induction voltage Vgen of the motor generator 5 is the same as or higher than the predetermined voltage Vz (Y), it is regarded that the motor generator 5 can continue electric-power generation, and then in the step S312, the state of the DC/DC converter 1 is switched to the one where electric power is supplied from the high-voltage side to the low-voltage side so that the low-voltage-side output voltage Vdcl of the DC/DC converter 1 becomes the low-voltage-side voltage V1; then, the processing is ended in the step S307.

In the case where in the step S500, it is determined that the induction voltage Vgen of the motor generator 5 is lower than the predetermined voltage Vz (N), it is regarded that the motor generator 5 cannot continue electric-power generation, and in the step S700, step-up electric power conversion by the electric power converter 8 is applied to the induction voltage Vgen of the motor generator 5 and the predetermined voltage Vz is supplied to the high-voltage-side wiring 12 so that the motor generator 5 can continue electric-power generation.

Next, in the step S312, the state of the DC/DC converter 1 is turned to the one where electric power is supplied from the high-voltage side to the low-voltage side so that the low-voltage-side output voltage Vdcl of the DC/DC converter 1 becomes the low-voltage-side voltage V1; then, the processing is ended in the step S307.

The foregoing operation makes it possible to prevent the motor generator 5 from stopping electric-power generation when the state where the motor generator 5 supplies electric power from the low-voltage side to the high-voltage side is switched to the state where the motor generator 5 supplies electric power from the high-voltage side to the low-voltage side; therefore, while the high-voltage electric storage device fails and is shut down, it is made possible that after a low-voltage electric storage device supplies electric power to the high-voltage-side magnetic-field circuit by way of the DC/DC converter, the electric power generated by the high-voltage-side electric power generator is supplied to the low-voltage-side electric load and the low-voltage electric storage device by way of the same DC/DC converter.

Figure 8:
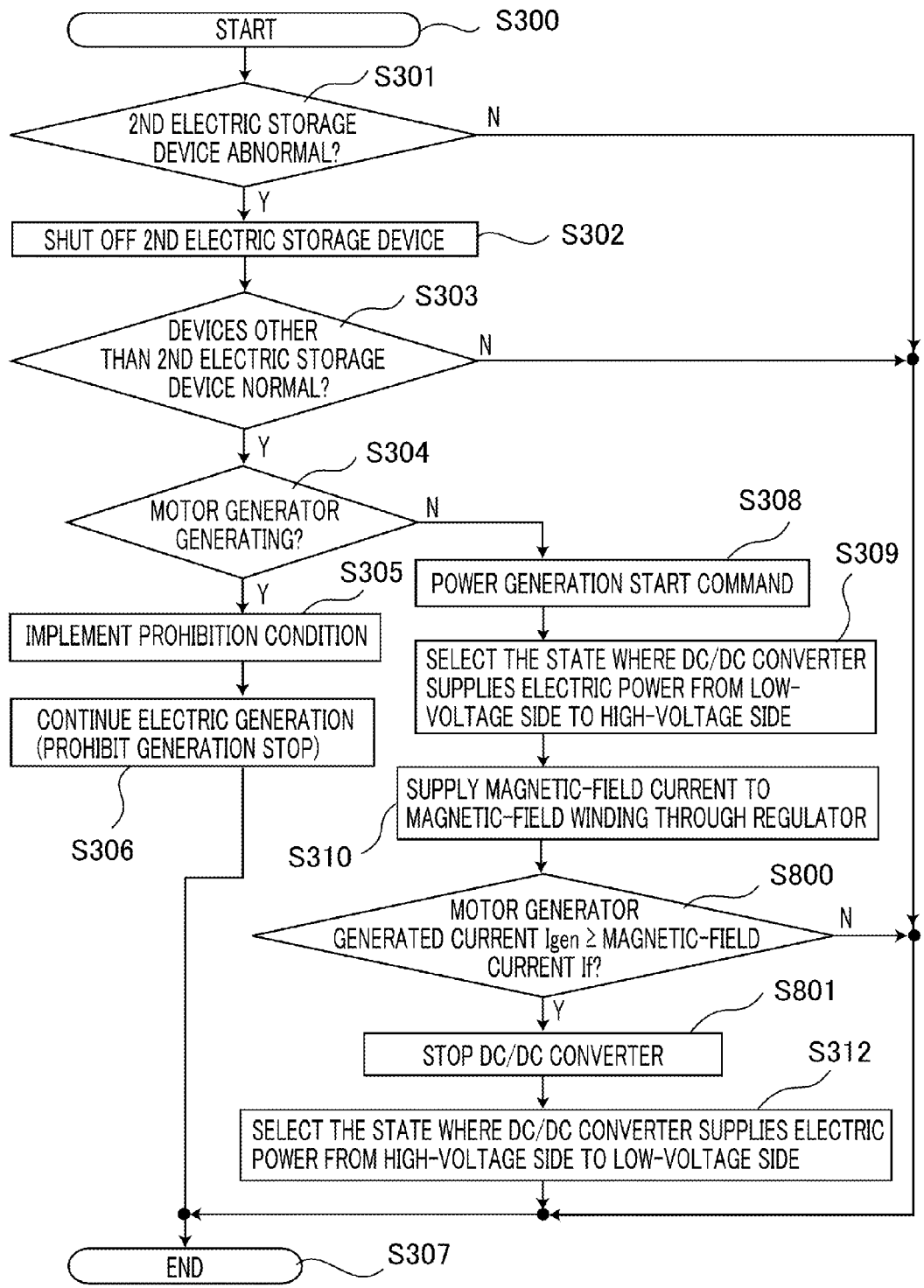
FIG. 8 is a flowchart for explaining part of the operation of the vehicle power source system according to Embodiment 1 of the present invention.

Next, with reference to the flowchart in FIG. 8, there will be explained the operation in which after the motor generator 5 has come into the autonomous electric-power generation mode, the state where the DC/DC converter 1 supplies electric power from the low-voltage side to the high-voltage side is switched to the state where the DC/DC converter 1 supplies electric power from the high-voltage side to the low-voltage side. FIG. 8 is a flowchart for explaining part of the operation of the vehicle power source system according to Embodiment 1 of the present invention. The steps S300 through S310 in FIG. 8 are the same as those in FIG. 3.

In FIG. 8, in the step S800, it is determined whether or not an electric-power generation current Igen of the motor generator 5 is the same as or larger than the magnetic-field current If with which the motor generator 5 can perform autonomous power generation. In this situation, as a preferred example, because in the case where the state where the DC/DC converter 1 supplies electric power from the low-voltage side to the high-voltage side is switched to the state where the DC/DC converter 1 supplies electric power from the high-voltage side to the low-voltage side, the magnetic-field current If decreases, the electric-power generation current Igen is made to increase by the decreasing amount of the magnetic-field current If.

In the case where in the step S800, it is determined that the electric-power generation current Igen of the motor generator 5 is the same as or larger than the magnetic-field current If with which the motor generator 5 can perform autonomous power generation (Y), the state where the DC/DC converter 1 supplies electric power from the low-voltage side to the high-voltage side is temporarily stopped in the step S801.

Next, in the step S312, the state of the DC/DC converter 1 is turned to the one where electric power is supplied from the high-voltage side to the low-voltage side so that the low-voltage-side output voltage Vdcl of the DC/DC converter 1 becomes the low-voltage-side voltage V1.

In the case where in the step S800, it is determined that the electric-power generation current Igen of the motor generator 5 is smaller than the magnetic-field current If of the magnetic-field winding 6 with which the motor generator 5 can perform autonomous power generation (N), the processing is ended in the step S307 because when the DC/DC converter 1 stops or the operation thereof is switched, the motor generator 5 cannot perform autonomous power generation and hence electric-power generation may be stopped.

The foregoing operation makes it possible to prevent the motor generator 5 from stopping electric-power generation when the state where the motor generator 5 supplies electric power from the low-voltage side to the high-voltage side is switched to the state where the motor generator 5 supplies electric power from the high-voltage side to the low-voltage side; therefore, while the high-voltage electric storage device fails and is shut down, it is made possible that after a low-voltage electric storage device supplies electric power to the high-voltage-side magnetic-field circuit byway of the DC/DC converter, the electric power generated by the high-voltage-side electric power generator is supplied to the low-voltage-side electric load and the low-voltage electric storage device by way of the same DC/DC converter.

Figure 9:
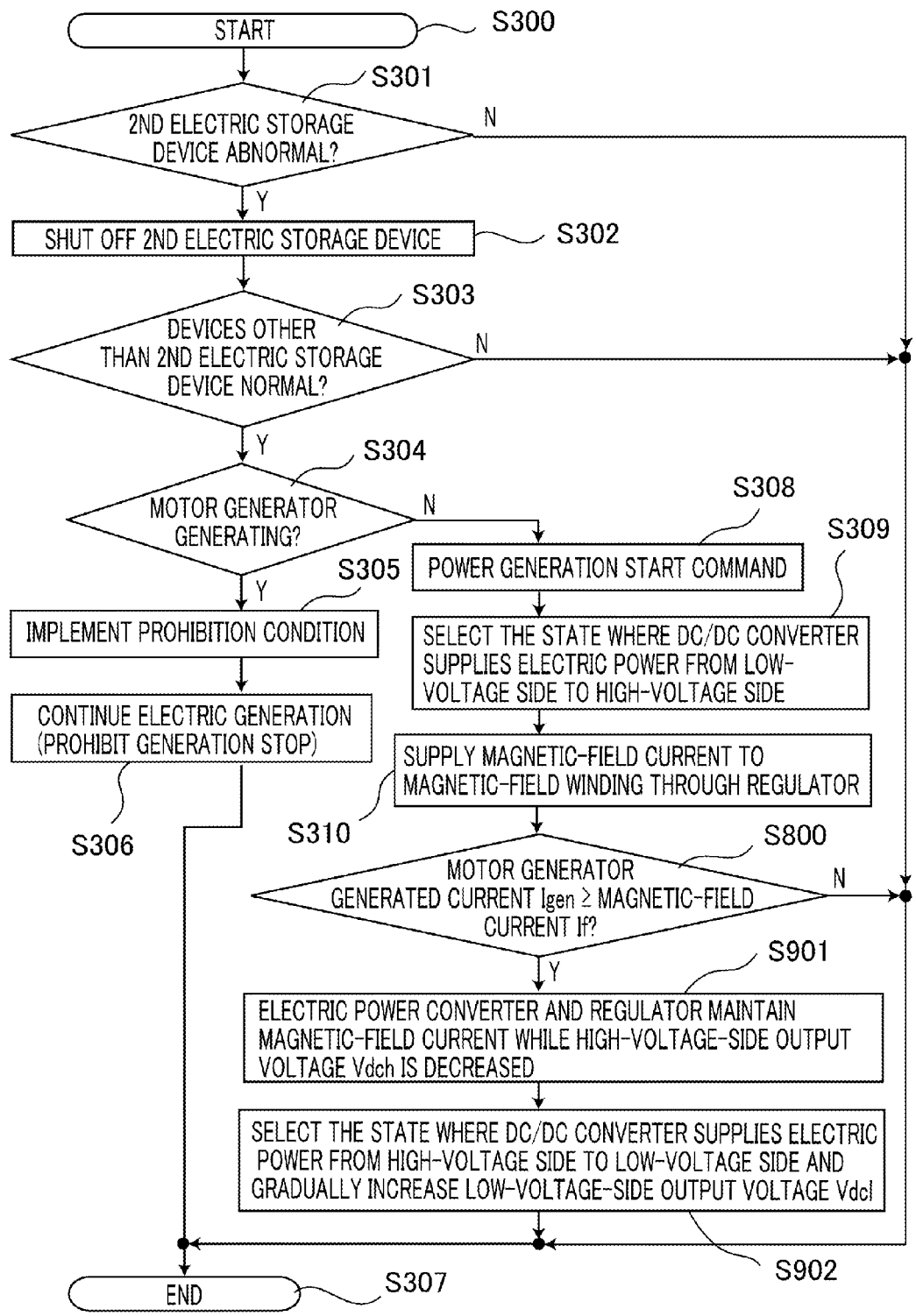
FIG. 9 is a flowchart for explaining part of the operation of the vehicle power source system according to Embodiment 1 of the present invention.

Next, with reference to the flowchart in FIG. 9, there will be explained the operation in which after the motor generator 5 has come into the autonomous electric-power generation mode, the state where the DC/DC converter 1 supplies electric power from the low-voltage side to the high-voltage side is gradually switched to the state where the DC/DC converter 1 supplies electric power from the high-voltage side to the low-voltage side. FIG. 9 is a flowchart for explaining part of the operation of the vehicle power source system according to Embodiment 1 of the present invention. The steps S300 through S310 in FIG. 9 are the same as those in FIG. 3.

In FIG. 9, in the step S800, it is determined whether or not the electric-power generation current Igen of the motor generator 5 is the same as or larger than the magnetic-field current If with which the motor generator 5 can perform autonomous power generation. In the case where in the step S800, it is determined that the electric-power generation current Igen of the motor generator 5 is the same as or larger than the magnetic-field current If with which the motor generator 5 can perform autonomous power generation (Y), in the step S901, the state where the motor generator 5 supplies electric power from the low-voltage side to the high-voltage side is switched to the state where the motor generator 5 supplies electric power from the high-voltage side to the low-voltage side.

In this regard, however, when the electric-power supply by the DC/DC converter 1 from the low-voltage side to the high-voltage side is reduced or stopped, the magnetic-field current If may decrease to a value with which electric power cannot be generated and hence electric-power generation by the motor generator 5 may be stopped. Accordingly, as a preferred example, the state where the DC/DC converter 1 supplies electric power from the low-voltage side to the high-voltage side is not instantaneously stopped, but the state is stopped while the high-voltage-side output voltage Vdch is gradually decreased. Furthermore, collaboratively, the output of the electric power converter 8 to the high-voltage-side wiring is gradually increased, the magnetic-field current If to the magnetic-field winding 6 is gradually increased by the regulator 7, or the power-generation amount of the motor generator 5 is gradually increased.

Next, in the step S902, the state of the DC/DC converter 1 is turned to the one where electric power is supplied from the high-voltage side to the low-voltage side so that the low-voltage-side output voltage Vdcl of the DC/DC converter 1 becomes the low-voltage-side voltage V1. However, in this situation, because due to the switching of the operation of the DC/DC converter 1, the power consumption increases, the magnetic-field current If to the magnetic-field winding 6 decreases and hence electric-power generation by the motor generator 5 may be stopped. Accordingly, as a preferred example, the low-voltage-side output of the DC/DC converter 1 is gradually increased (concurrently, the power consumption of the DC/DC converter 1 gradually increases); collaboratively, the output voltage of the electric power converter 8 is gradually increased, the magnetic-field current If to the magnetic-field winding 6 is gradually increased by the regulator 7, or the power-generation amount of the motor generator 5 is gradually increased.

In FIG. 9, in the step S800, it is determined whether or not the electric-power generation current Igen of the motor generator 5 is the same as or larger than the magnetic-field current If, of the magnetic-field winding 6, with which the motor generator 5 can perform autonomous power generation. In the case where in the step S800, it is determined that the electric-power generation current Igen of the motor generator 5 is smaller than the magnetic-field current If of the magnetic-field winding 6 with which the motor generator 5 can perform autonomous power generation (N), the processing is ended in the step S307 because when the DC/DC converter 1 stops or the operation thereof is switched, the motor generator 5 cannot perform autonomous power generation and hence electric-power generation may be stopped.

The foregoing operation makes it possible to prevent the motor generator 5 from stopping electric-power generation when the state where the motor generator 5 supplies electric power from the low-voltage side to the high-voltage side is switched to the state where the motor generator 5 supplies electric power from the high-voltage side to the low-voltage side; therefore, while the high-voltage electric storage device fails and is shut down, it is made possible that after a low-voltage electric storage device supplies electric power to the high-voltage-side magnetic-field circuit by way of the DC/DC converter, the electric power generated by the high-voltage-side electric power generator is supplied to the low-voltage-side electric load and the low-voltage electric storage device by way of the same DC/DC converter.

Next, with reference to the flowchart in FIG. 10, there will be explained the operation in which after the motor generator 5 has come into the operation mode where electric power can stably be generated, the state where the DC/DC converter 1 supplies electric power from the low-voltage side to the high-voltage side is switched to the state where the DC/DC converter 1 supplies electric power from the high-voltage side to the low-voltage side. FIG. 10 is a flowchart for explaining part of the operation of the vehicle power source system according to Embodiment 1 of the present invention. The steps S300 through S310 in FIG. 10 are the same as those in FIG. 3. The step S500 in FIG. 10 is the same as that in FIG. 5.

In FIG. 10, it is determined in the step SA00 whether or not the present operation region is an operation region where the motor generator 5 can stably generate electric power, for example, an engine rotation speed region between a predetermined rotation speed 1 and a predetermined rotation speed 2 where the motor generator 5 can stably generate electric power. The operation region where the motor generator 5 can stably generate electric power will be described later.

In the case where in the step SA00, it is determined that the present operation region is an operation region where the motor generator 5 can stably generate electric power, for example, an engine rotation speed region between a predetermined rotation speed 1 and a predetermined rotation speed 2 where the motor generator 5 can stably generate electric power (Y), as is the case in FIG. 5, in the step S312, the state of the DC/DC converter 1 is turned to the one where electric power is supplied from the high-voltage side to the low-voltage side so that the low-voltage-side output voltage Vdcl of the DC/DC converter 1 becomes the low-voltage-side voltage V1; then, the processing is ended in the step S307.

In contrast, in the case where in the step SA00, it is determined that the present operation region is not an engine rotation speed region between a predetermined rotation speed 1 and a predetermined rotation speed 2 where the motor generator 5 can stably generate electric power (N), the processing is ended in the step S307 because when the DC/DC converter 1 stops or the operation thereof is switched, the motor generator 5 cannot perform autonomous power generation and hence electric-power generation may be stopped.

Hereinafter, the operation region where the motor generator 5 can stably generate electric power will be explained. For example, in the case where when the motor generator 5 having the output current vs. engine rotation speed characteristic, represented in FIG. 13, is utilized, the B-terminal voltage to be supplied to the motor generator 5 is 30 V, electric power cannot be generated with the engine rotation speed lower than 1125[r/min]; 28 V, 1000 [r/min]; 24 V, 750 [r/min]; 20 V, 625 [r/min]; and 12 V, 500 [r/min]. Therefore, in the vicinity of each of the foregoing engine rotation speeds, when due to an variation in the rotation speed, the output of the DC/DC converter 1 is stopped, the electric-power generation current of the motor generator cannot fulfill the magnetic-field current If and hence electric-power generation is liable to stop. Accordingly, in order to enable the motor generator 5 to continue electric-power generation even when the engine rotation speed decreases, it is important to set the operation region to an engine rotation speed with which a margin for the output current vs. engine rotation speed characteristic is secured.

Thus, as a preferred example, the engine rotation speed with which the forgoing margin has been secured is adopted as the operation region where the motor generator 5 can stably generate electric power. For example, in the case where the B-terminal voltage to be supplied to the motor generator 5 is fixed to 24 V, the predetermined rotation speed 1 and the predetermined rotation speed 2 are set to 900 [r/min] and 10000 [r/min], respectively. The predetermined rotation speed 1 of 900 [r/min] is an setting example obtained by adding a margin of 150 [r/min] to the engine rotation speed of 750 [r/min] at which electric-power generation stops; the predetermined rotation speed 2 of 10000 [r/min] is an setting example obtained by removing the upper limit of the predetermined rotation speed 2.

As described above, when the operation of the DC/DC converter 1 is switched in the engine rotation speed region where the motor generator 5 can stably generate electric power, the decrease in the magnetic-field current If of the magnetic-field winding 6 caused by the operation switching of the DC/DC converter 1 can be prevented and electric-power generation can further be continued.

In the example represented in FIG. 10, as the condition for determining the operation region where the motor generator 5 can stably generate electric power, the engine rotation speed is utilized; however, the B-terminal voltage to be supplied to the motor generator 5 or the magnetic-field current If to be supplied to the magnetic-field winding may be utilized as the condition; alternatively, in accordance with the characteristic of the motor generator 5, the engine rotation speed region may be switched depending on the magnetic-field current If and the B-terminal voltage.

As a preferable example, when based on the output current vs. engine rotation speed characteristic in FIG. 13, the collaboration among the vehicle power source system, the internal combustion engine, and the transmission makes the motor generator 5 operate in such a way that after it starts electric-power generation, it does not come into an operation region where electric-power generation stops, electric-power generation can be continued until the internal combustion engine stops, while the current cutoff mechanism 9 cuts off the charging and discharging currents for the second electric storage device 3.

For example, in the case where a driver releases the accelerator in order to lower the vehicle speed and hence the engine rotation speed is likely to decrease to the predetermined rotation speed 1, collaborative operation such as lowering the transmission ratio may be implemented so that even when the vehicle speed decreases, the engine rotation speed does not decrease.

For example, in order to prevent the engine rotation speed from decreasing, collaborative operation may be implemented in such a way that the load of the DC/DC converter 1 is temporarily increased and the power-generation amount of the motor generator is increased so that the throttle opening degree corresponding to the electric load is obtained.

For example, in order to prevent electric-power generation from being stopped, even when the engine rotation speed decreases, operation of widening the operation region where electric power can be generated may be implemented in such a way that the B-terminal voltage is temporarily decreased so that the predetermined rotation speed 1 decreases.

Figure 11A:
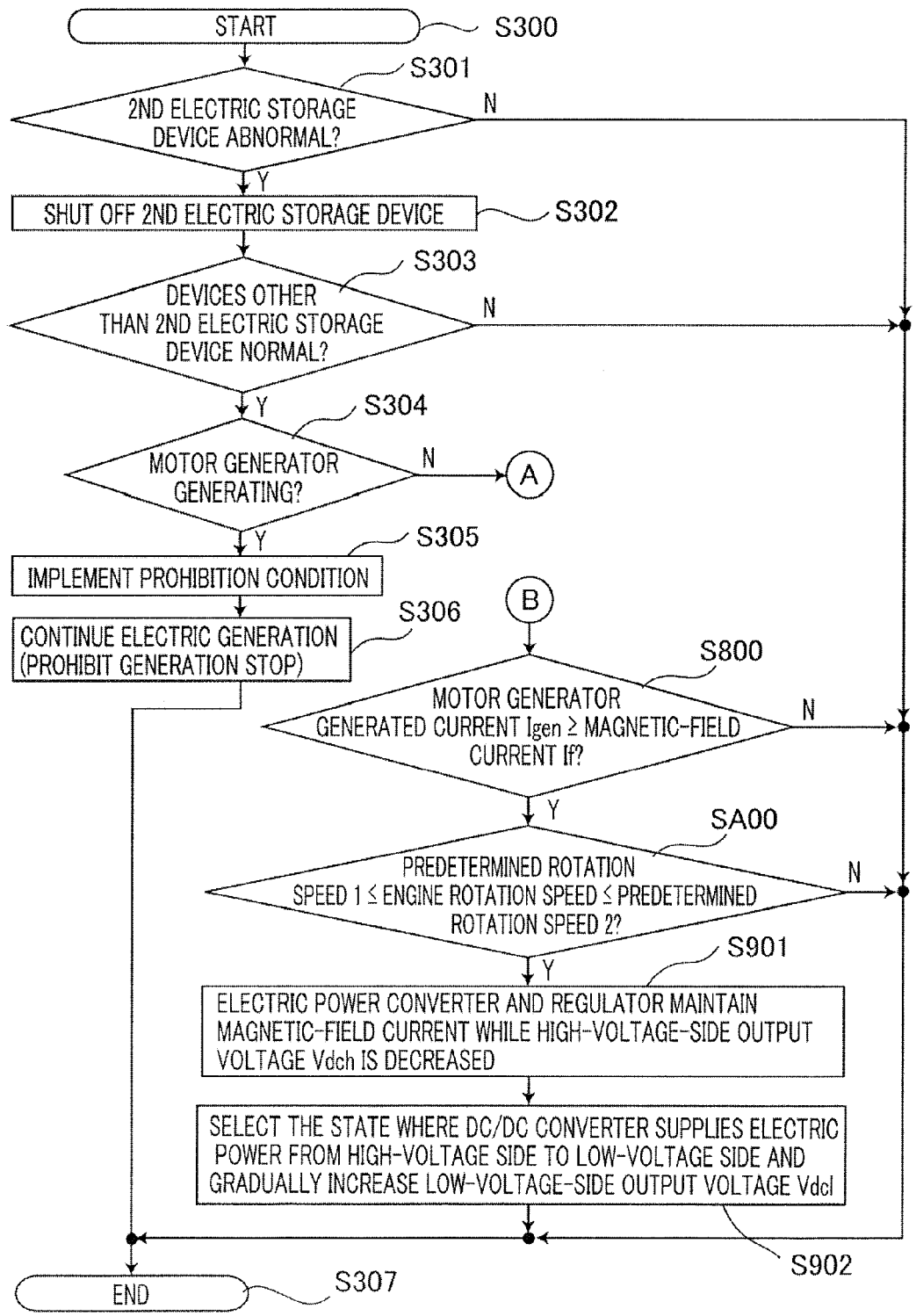
FIG. 11A and FIG. 11B are flowcharts for explaining the overall operation of the vehicle power source system according to Embodiment 1 of the present invention.
Figure 11B:
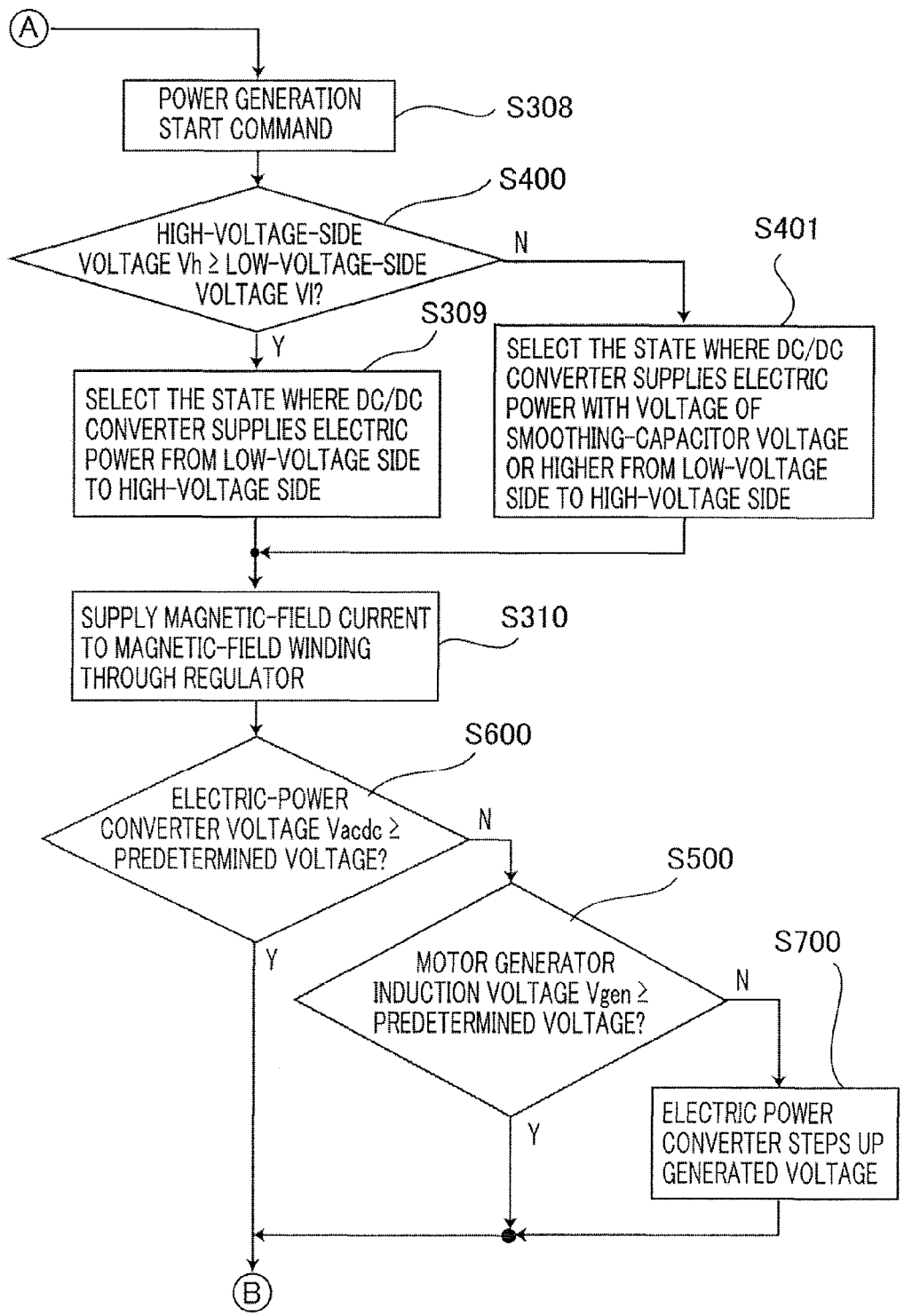

Next, with reference to the flowchart in FIG. 11A and FIG. 11B, suitable operation in which FIGS. 3 through 10 are collected will be explained. FIG. 11A and FIG. 11B are flowcharts for explaining the overall operation of the vehicle power source system according to Embodiment 1 of the present invention. The steps S300 through S310 in FIG. 11A and FIG. 11B are the same as those in FIG. 3. Moreover, the steps S400 through S401 in FIG. 11A and FIG. 11B are the same as those in FIG. 4A and FIG. 4B.

In FIG. 11A and FIG. 11B, in the step S600, it is determined whether or not the output voltage Vacdc of the electric power converter 8 is the same as or higher than the predetermined voltage Vz. In the case where in the step S600, it is determined that the output voltage Vacdc of the electric power converter 8 is lower than the predetermined voltage Vz (N), it is determined in the step S500 whether or not the induction voltage Vgen of the motor generator 5 is the same as or higher than the predetermined voltage Vz.

In the case where in the step S500, it is determined that the induction voltage Vgen of the motor generator 5 is lower than the predetermined voltage Vz (N), in the step S700, the electric power converter 8 applies step-up electric power conversion to the induction voltage Vgen of the motor generator 5 and the predetermined voltage Vz is supplied to the high-voltage-side wiring 12.

In contrast, in the case where in the step S600, it is determined that the output voltage Vacdc of the electric power converter 8 is the same as or higher than the predetermined voltage Vz (Y) or in the case where in the step S500, it is determined that the induction voltage Vgen of the motor generator 5 is the same as or higher than the predetermined voltage Vz (Y), the step S600 or the step S500 is followed by the step S800.

Next, in the step S800, it is determined whether or not the electric-power generation current Igen of the motor generator 5 is the same as or larger than the magnetic-field current If with which the motor generator 5 can perform autonomous power generation. In the case where in the step S800, it is determined that the electric-power generation current Igen of the motor generator 5 is smaller than the magnetic-field current If with which the motor generator 5 can perform autonomous power generation (N), the processing is ended in the step S307 because when the DC/DC converter 1 stops or the operation thereof is switched, the motor generator 5 cannot perform autonomous power generation and hence electric-power generation may be stopped.

In the case where in the step S800, it is determined that the electric-power generation current Igen of the motor generator 5 is the same as or larger than the magnetic-field current If with which the motor generator 5 can perform autonomous power generation (Y), the step S800 is followed by the step SA00. In the step SA00, it is determined whether or not the present engine rotation speed is in the engine rotation speed region between the predetermined rotation speed 1 and the predetermined rotation speed 2 where the motor generator 5 can stably generate electric power. In the case where in the step SA00, it is determined that the present engine rotation speed is not in the engine rotation speed region between the predetermined rotation speed 1 and the predetermined rotation speed 2 where the motor generator 5 can stably generate electric power (N), the processing is ended in the step S307 because when the DC/DC converter 1 stops or the operation thereof is switched, the motor generator 5 cannot perform autonomous power generation and hence electric-power generation may be stopped.

In contrast, in the case where in the step SA00, it is determined that the present engine rotation speed is in the engine rotation speed region between the predetermined rotation speed 1 and the predetermined rotation speed 2 where the motor generator 5 can stably generate electric power (Y), in the step S901, the magnetic-field current is maintained by the electric power converter 8 and the regulator 7 while the high-voltage-side output voltage Vdch is decreased. Next, in the step S902, the state of the DC/DC converter 1 is turned to the one where electric power is supplied from the high-voltage side to the low-voltage side so that the low-voltage-side output voltage Vdcl gradually increases; then, the processing is ended in the step S307.

The foregoing operation makes it possible to prevent the motor generator 5 from stopping electric-power generation when the state where the motor generator 5 supplies electric power from the low-voltage side to the high-voltage side is switched to the state where the motor generator 5 supplies electric power from the high-voltage side to the low-voltage side; therefore, while the high-voltage electric storage device fails and is shut down, it is made possible that after a low-voltage electric storage device supplies electric power to the high-voltage-side magnetic-field circuit byway of the DC/DC converter, the electric power generated by the high-voltage-side electric power generator is supplied to the low-voltage-side electric load and the low-voltage electric storage device by way of the same DC/DC converter. Moreover, electric-power generation can be continued.

Heretofore, with reference to the flowcharts, there has been explained the operation at a time when due to a failure of the second electric storage device 3, the charging and discharging currents for the second electric storage device 3 is cut off; however, also in the case where in order to diagnose a vehicle power source system, the charging and discharging currents for the second electric storage device 3 is cut off, similar operation is implemented, so that electric-power generation can be started.

The vehicle power source systems, described heretofore, according to Embodiment 1 of the present invention are the ones obtained by putting the following inventions into practice.

(1) A vehicle power source system comprising:
a first electric storage device;
a second electric storage device that can store electric power with a voltage higher than that of the first electric storage device;
a current cutoff mechanism that can cut off charging and discharging currents for the second electric storage device;
a low-voltage-side wiring connected with the first electric storage device;
a high-voltage-side wiring connected with the second electric storage device;
an AC power generator that has an armature winding and a magnetic-field winding for generating magnetic flux interlinked with the armature winding and is driven by rotation power of a driving source mounted in a vehicle so as to generate AC electric power across the armature winding;
an electric power converter that is connected with the high-voltage-side wiring and converts the AC electric power generated by the AC power generator into DC electric power so as to supply the DC electric power to the high-voltage-side wiring;

a regulator circuit that is connected with the high-voltage-side wiring and supplies electric power to the magnetic-field winding;

a smoothing capacitor connected in parallel with the electric power converter; and a DC/DC converter whose high-voltage side and low-voltage side are connected with the high-voltage-side wiring and the low-voltage-side wiring, respectively, and that can perform voltage conversion between the high-voltage side and the low-side voltage side, wherein while the current cutoff mechanism cuts off charging and discharging currents for the second electric storage device, the DC/DC converter is controlled so as to be in a state where electric power is supplied from the low-voltage side to the high-voltage side, applies voltage conversion to an input voltage of the low-voltage side so that an output voltage of the high-voltage side becomes a predetermined voltage, and supplies electric power to the magnetic-field winding based on the predetermined voltage so as to raise an induction voltage across the armature winding of the AC power generator, and wherein after a predetermined state where the induction voltage of the AC power generator can be supplied to the low-voltage side is reached, control of the DC/DC converter is switched from the state where electric power is supplied from the low-voltage side to the high-voltage side to a state where electric power is supplied from the high-voltage side to the low-voltage side, and the DC/DC converter supplies generated electric power based on the induction voltage of the AC power generator to the low-voltage side.

(2) The vehicle power source system according to the invention disclosed in the foregoing (1), wherein the DC/DC converter has a function of stepping down an input voltage, of the high-voltage side, that is within a constant voltage range and outputting the stepped-down voltage to the low-voltage side, and wherein the predetermined voltage is a voltage within the constant voltage range.

(3) The vehicle power source system according to the invention disclosed in the foregoing (2), wherein the predetermined voltage is the minimum voltage in the constant voltage range.

(4) The vehicle power source system according to the invention disclosed in the foregoing (2), wherein the predetermined voltage is a voltage at a time when the multiplication product of the power generation efficiency of the AC power generator, the conversion efficiency of the electric power converter, and the conversion efficiency of the DC/DC converter in the interval in which electric power generated by the AC power generator is being supplied to the low-voltage-side wiring by way of the electric power converter and the DC/DC converter becomes maximum in the constant voltage range.

(5) The vehicle power source system according to the invention disclosed in the foregoing item (1), wherein the predetermined voltage is the same as or higher than the voltage across the smoothing capacitor.

(6) The vehicle power source system according to the invention disclosed in the foregoing item (1), wherein the DC/DC converter includes a synchronous-rectification non-insulated step-down DC/DC converter that has a chopper MOSFET, a circulation MOSFET, and a current-smoothing reactor and steps down an input voltage of the high-voltage side so as to output the stepped-down input voltage to the low-voltage side;

a reverse-flow prevention MOSFET that prevents a current from reversely flowing from the output of the low-voltage side to the input of the high-voltage side; and a circulation diode that is connected in parallel with the synchronous-rectification non-insulated step-down DC/DC converter and between the synchronous-rectification non-insulated step-down DC/DC converter and the reverse-flow prevention MOSFET and whose cathode is connected with the low-voltage-side wiring, wherein when a voltage of the high-voltage side of the synchronous-rectification non-insulated step-down DC/DC converter is lower than the voltage of the first electric storage device, the reverse-flow prevention MOSFET is switched so that a voltage inputted to the low-voltage side is stepped down and outputted to the high-voltage side, and when the voltage of the high-voltage side of the synchronous-rectification non-insulated step-down DC/DC converter is the same as or higher than the voltage of the first electric storage device, the circulation MOSFET is switched so that the voltage inputted to the low-voltage side is stepped up and outputted to the high-voltage side, so that voltage conversion is performed in such a way that the high-voltage-side voltage becomes the predetermined voltage.

(7) The vehicle power source system according to the invention disclosed in the foregoing item (1), wherein the predetermined state is a state where the induction voltage of the AC power generator is the same as or higher than the predetermined voltage.

(8) The vehicle power source system according to the invention disclosed in the foregoing item (1), wherein the predetermined state is a state where the output voltage of the electric power converter to the high-voltage-side wiring is the same as or higher than the predetermined voltage.

(9) The vehicle power source system according to the invention disclosed in the foregoing item (1), wherein the electric power converter has a function of converting AC electric power into DC electric power and stepping up the induction voltage of the AC power generator so as to supply the stepped-up induction voltage to the high-voltage-side wiring, and wherein the predetermined state is a state where the induction voltage of the AC power generator is stepped up to be the same as or higher than the predetermined voltage by the electric power converter and is supplied to the high-voltage-side wiring.

(10) The vehicle power source system according to the invention disclosed in the foregoing item (1), wherein the AC power generator has a function of maintaining the autonomous electric-power generation mode, wherein before the control of the DC/DC converter is switched from the state where electric power is supplied from the low-voltage side to the high-voltage side to the state where electric power is supplied from the high-voltage side to the low-voltage side, the AC power generator is made to be in the autonomous electric-power generation mode, and wherein after the AC power generator is made to be in the autonomous electric-power generation mode, the state where electric power is supplied from the low-voltage side to the high-voltage side is stopped and then the control of the DC/DC converter is switched to the state where electric power is supplied from the high-voltage side to the low-voltage side so that supply of electric power from the high-voltage side to the low-voltage side is started and the power-generation amount of the AC power generator is increased.

(11) The vehicle power source system according to the invention disclosed in the foregoing item (1), wherein the AC power generator has a function of maintaining the autonomous electric-power generation mode, wherein before the control of the DC/DC converter is switched from the state where electric power is supplied from the low-voltage side to the high-voltage side to the state where electric power is supplied from the high-voltage side to the low-voltage side, the AC power generator is made to be in the autonomous electric-power generation mode, and wherein after the AC power generator is made to be in the autonomous electric-power generation mode, the control of the DC/DC converter is switched from the state where electric power is supplied from the low-voltage side to the high-voltage side to the state where electric power is supplied from the high-voltage side to the low-voltage side, after an electric-power supply amount is gradually decreased, so that supply of electric power from the high-voltage side to the low-voltage side is started so as to gradually increase the electric supply amount and the power-generation amount of the AC power generator is increased.

(12) The vehicle power source system according to the invention disclosed in the foregoing item (1), wherein after the AC power generator is made to be in an operation region where electric power can stably be generated, the control of the DC/DC converter is switched from the state where electric power is supplied from the low-voltage side to the high-voltage side to the state where electric power is supplied from the high-voltage side to the low-voltage side.

(13) The vehicle power source system according to the invention disclosed in the foregoing item (1), wherein while the current cutoff mechanism cuts off charging and discharging currents for the second electric storage device, the AC power generator starts electric-power generation and then continues the electric-power generation until the driving source stops.

(14) The vehicle power source system according to the invention disclosed in the foregoing item (1), wherein while the current cutoff mechanism cuts off charging and discharging currents for the second electric storage device, the AC power generator starts electric-power generation and then in order to continue the electric-power generation until the driving source stops, the vehicle power source system operates in collaboration with the driving source and the transmission of the vehicle so that the AC power generator is made to be in the operation region where electric power can stably be generated.

(15) The vehicle power source system according to the invention disclosed in the foregoing item (1), wherein the AC power generator is a motor generator.

In the scope of the present invention, the embodiments thereof can appropriately be modified or omitted.

INDUSTRIAL APPLICABILITY

A vehicle power source system according to the present invention can be applied to the field of production and sales of a vehicle, especially, an automobile.

DESCRIPTION OF REFERENCE NUMERALS

1: DC/DC converter
2: 1st electric storage device
3: 2nd electric storage device
4: smoothing capacitor
5: motor generator
6: magnetic-field winding
7: regulator
8: electric power converter
9: current cutoff mechanism
10: electric load
11: low-voltage-side wiring
12: high-voltage-side wiring
13: control apparatus
20: synchronous-rectification non-insulated step-down DC/DC converter
21: chopper MOSFET
22: reverse-flow prevention MOSFET
23: circulation MOSFET
24: current-smoothing reactor
25: input smoothing capacitor
26: circulation diode
27: output smoothing capacitor
28: output smoothing capacitor
29: high-voltage-side wiring
30: low-voltage-side wiring

The invention claimed is:

1. A vehicle power source system comprising:
a first electric storage device;
a second electric storage device configured to store electric power with a voltage higher than that of the first electric storage device;
a controller;
a low-voltage-side wiring connected with the first electric storage device;
a high-voltage-side wiring connected with the second electric storage device;
an AC power generator that has an armature winding and a magnetic-field winding for generating magnetic flux interlinked with the armature winding and is driven by rotation power of a driving source mounted in a vehicle so as to generate an AC electric power across the armature winding;
an electric power converter that is connected with the high-voltage-side wiring and converts the AC electric power generated by the AC power generator into a DC electric power, to supply the DC electric power to the high-voltage-side wiring;
a regulator circuit that is connected with the high-voltage-side wiring and supplies the DC electric power to the magnetic-field winding;
a smoothing capacitor connected in parallel with the electric power converter;
a DC/DC converter whose high-voltage side and low-voltage side are connected with the high-voltage-side wiring and the low-voltage-side wiring, respectively, and that is controlled by the controller to perform voltage conversion between the high-voltage side and the low-voltage side and vice versa; and
a current cutoff mechanism having a first terminal connected to the second electric storage device and a second terminal connected to the electric power converter and to the DC/DC converter via the high-voltage-side wiring, the current cutoff mechanism being configured to be controlled by the controller to cut off a charging current and a discharging current of the second electric storage device by disconnecting the second electric storage device from the high-voltage-side wiring, wherein, while the charging current and the discharging current for the second electric storage device is cut off, the controller is configured to determine whether the AC power generator generates the AC electric power,
in response to determining that the AC power generator does not generate the AC electric power, the controller controls the DC/DC converter to supply electric power from the low-voltage side to the high-voltage side, wherein the controller further controls the DC/DC converter to perform the voltage conversion of an input voltage on the low-voltage side so that an output voltage on the high-voltage side becomes a predetermined voltage, and to supply the electric power to the magnetic-field winding based on the predetermined voltage to raise an induction voltage across the armature winding of the AC power generator, and
wherein, after a predetermined state where the induction voltage of the AC power generator can be supplied to the low-voltage side is reached, the controller controls the DC/DC converter to switch and to start supplying the electric power from the high-voltage side to the low-voltage side based on the induction voltage of the AC power generator.

2. The vehicle power source system according to claim 1, wherein the DC/DC converter has a function of stepping down an input voltage, of the high-voltage side, that is within a constant voltage range and outputting the stepped-down voltage to the low-voltage side, and
wherein the predetermined voltage is a voltage within the constant voltage range.

3. The vehicle power source system according to claim 2, wherein the predetermined voltage is a minimum voltage in the constant voltage range.

4. The vehicle power source system according to claim 2, wherein the predetermined voltage is a voltage at a time when a multiplication product of a power generation efficiency of the AC power generator, a conversion efficiency of the electric power converter, and the conversion efficiency of the DC/DC converter in an interval in which the electric power generated by the AC power generator is being supplied to the low-voltage-side wiring by way of the electric power converter and the DC/DC converter becomes maximum in the constant voltage range.

5. The vehicle power source system according to claim 1, wherein the predetermined voltage is the same as or higher than the voltage across the smoothing capacitor.

6. The vehicle power source system according to claim 1, wherein the DC/DC converter includes:
a synchronous-rectification non-insulated step-down DC/DC converter that has a chopper MOSFET, a circulation MOSFET, and a current-smoothing reactor and steps down an input voltage of the high-voltage side so as to output the stepped-down input voltage to the low-voltage side;
a reverse-flow prevention MOSFET that prevents a current from reversely flowing from the output of the low-voltage side to an input of the high-voltage side; and
a circulation diode that is connected in parallel with the synchronous-rectification non-insulated step-down DC/DC converter and between the synchronous-rectification non-insulated step-down DC/DC converter and the reverse-flow prevention MOSFET and whose cathode is connected with the low-voltage-side wiring,
wherein when a voltage of the high-voltage side of the synchronous-rectification non-insulated step-down DC/DC converter is lower than the voltage of the first electric storage device, the reverse-flow prevention MOSFET is switched so that a voltage inputted to the low-voltage side is stepped down and outputted to the high-voltage side, and when the voltage of the high-voltage side of the synchronous-rectification non-insulated step-down DC/DC converter is the same as or higher than the voltage of the first electric storage device, the circulation MOSFET is switched so that the voltage inputted to the low-voltage side is stepped up and outputted to the high-voltage side, so that the voltage conversion is performed in such a way that the voltage of the high-voltage side becomes the predetermined voltage.

7. The vehicle power source system according to claim 1, wherein the predetermined state is a state where the induction voltage of the AC power generator is the same as or higher than the predetermined voltage.

8. The vehicle power source system according to claim 1, wherein the predetermined state is a state where the output voltage of the electric power converter to the high-voltage-side wiring is the same as or higher than the predetermined voltage.

9. The vehicle power source system according to claim 1, wherein the electric power converter has a function of converting AC electric power into the DC electric power and stepping up the induction voltage of the AC power generator so as to supply the stepped-up induction voltage to the high-voltage-side wiring, and
wherein the predetermined state is a state where the induction voltage of the AC power generator is stepped up to be the same as or higher than the predetermined voltage by the electric power converter and is supplied to the high-voltage-side wiring.

10. The vehicle power source system according to claim 1, wherein the AC power generator has a function of maintaining an autonomous electric-power generation mode,
wherein before the control of the DC/DC converter is switched from the state where the electric power is supplied from the low-voltage side to the high-voltage side to the state where the electric power is supplied from the high-voltage side to the low-voltage side, the AC power generator is made to be in the autonomous electric-power generation mode, and
wherein after the AC power generator is made to be in the autonomous electric-power generation mode, the state where the electric power is supplied from the low-voltage side to the high-voltage side is stopped and then the control of the DC/DC converter is switched to the state where the electric power is supplied from the high-voltage side to the low-voltage side so that supply of the electric power from the high-voltage side to the low-voltage side is started and a power-generation amount of the AC power generator is increased.

11. The vehicle power source system according to claim 1, wherein the AC power generator has a function of maintaining an autonomous electric-power generation mode,
wherein before the control of the DC/DC converter is switched from the state where the electric power is supplied from the low-voltage side to the high-voltage side to the state where the electric power is supplied from the high-voltage side to the low-voltage side, the AC power generator is made to be in the autonomous electric-power generation mode, and
wherein after the AC power generator is made to be in the autonomous electric-power generation mode, the control of the DC/DC converter is switched from the state where the electric power is supplied from the low-voltage side to the high-voltage side to the state where the electric power is supplied from the high-voltage side to the low-voltage side, after an electric-power supply amount is gradually decreased, so that supply of the electric power from the high-voltage side to the low-voltage side is started so as to gradually increase an electric supply amount and a power-generation amount of the AC power generator is increased.

12. The vehicle power source system according to claim 1, wherein after the AC power generator is made to be in an operation region where the electric power can stably be generated, the control of the DC/DC converter is switched from the state where the electric power is supplied from the low-voltage side to the high-voltage side to the state where the electric power is supplied from the high-voltage side to the low-voltage side.

13. The vehicle power source system according to claim 1, wherein while the current cutoff mechanism cuts off the charging current and the discharging current for the second electric storage device, the AC power generator starts an electric-power generation and then continues the electric-power generation until the driving source stops.

14. The vehicle power source system according to claim 1, wherein while the current cutoff mechanism cuts off the charging current and the discharging current for the second electric storage device, the AC power generator starts an electric-power generation and then in order to continue the electric-power generation until the driving source stops, the vehicle power source system operates in collaboration with the driving source and a transmission of the vehicle so that the AC power generator is made to be in an operation region where the electric power can stably be generated.

15. The vehicle power source system according to claim 1, wherein the AC power generator is a motor generator.

\* \* \* \* \*